US012300889B2

(12) United States Patent
Hou et al.

(10) Patent No.: US 12,300,889 B2
(45) Date of Patent: May 13, 2025

(54) REDUCING REFLECTOR ANTENNA SPILLOVER LOBES AND BACK LOBES IN SATELLITE COMMUNICATION SYSTEMS

(71) Applicant: Hughes Network Systems, LLC, Germantown, MD (US)

(72) Inventors: Peter Hou, Germantown, MD (US); Stan Kay, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 17/521,690

(22) Filed: Nov. 8, 2021

(65) Prior Publication Data
US 2022/0149536 A1    May 12, 2022

Related U.S. Application Data

(60) Provisional application No. 63/111,494, filed on Nov. 9, 2020.

(51) Int. Cl.
*H01Q 19/02*    (2006.01)
*H01Q 1/28*    (2006.01)
(Continued)

(52) U.S. Cl.
CPC .......... *H01Q 19/026* (2013.01); *H01Q 1/288* (2013.01); *H01Q 19/022* (2013.01); *H01Q 19/19* (2013.01); *H04B 7/18513* (2013.01)

(58) Field of Classification Search
CPC .... H01Q 1/288; H01Q 19/022; H01Q 19/026; H01Q 19/19; H01Q 19/021; H04B 7/18513
See application file for complete search history.

(56) References Cited

U.S. PATENT DOCUMENTS

| 5,298,911 A | 3/1994 | Li |
| 5,341,150 A * | 8/1994 | Joy .................... H01Q 19/022 |
| | | 343/912 |

(Continued)

FOREIGN PATENT DOCUMENTS

| CA | 1222562 A | 6/1987 | |
| EP | 2466688 A1 * | 6/2012 | ............. H01Q 15/16 |

(Continued)

OTHER PUBLICATIONS

"International Search Report and Written Opinion on Application PCT/US2021/058470", mailed date Feb. 10, 2022, 6 pages.

*Primary Examiner* — Graham P Smith
*Assistant Examiner* — Leah Rosenberg
(74) *Attorney, Agent, or Firm* — Mannava & Kang, P.C.

(57) ABSTRACT

A system for reducing antenna spillover in a satellite communications system is disclosed. The system may include an apparatus comprising an antenna terminal, which in turn may include a sub-reflector and a main reflector. The main reflector may include at least one of an extension, a shroud, and a serrated edge. The extension may be a full rim extension or a partial extension. The shroud may be a full shroud or a partial shroud. The serrated edge may include a straight serration or a curved serration, the serrated edge also having various dimensions and profiles. In some examples, the sub-reflector and the main reflector of the antenna terminal may be provided and configured to reduce antenna spillover in accordance with antenna performance and interference restrictions set forth by one or more governing bodies.

12 Claims, 23 Drawing Sheets

(51) Int. Cl.
*H01Q 19/19* (2006.01)
*H04B 7/185* (2006.01)

(56) References Cited

U.S. PATENT DOCUMENTS

| | | | |
|---|---|---|---|
| 6,611,238 B1 * | 8/2003 | Santoru | H01Q 13/02 343/840 |
| 2013/0300621 A1 | 11/2013 | Brandau et al. | |
| 2017/0229773 A1 * | 8/2017 | Lee | H01Q 1/523 |

FOREIGN PATENT DOCUMENTS

| | | | |
|---|---|---|---|
| EP | 3207592 A2 | | 8/2017 |
| JP | S-54134959 A | * | 10/1979 |
| JP | H09312518 A | | 12/1997 |
| JP | 3763428 B2 | * | 4/2006 |

* cited by examiner

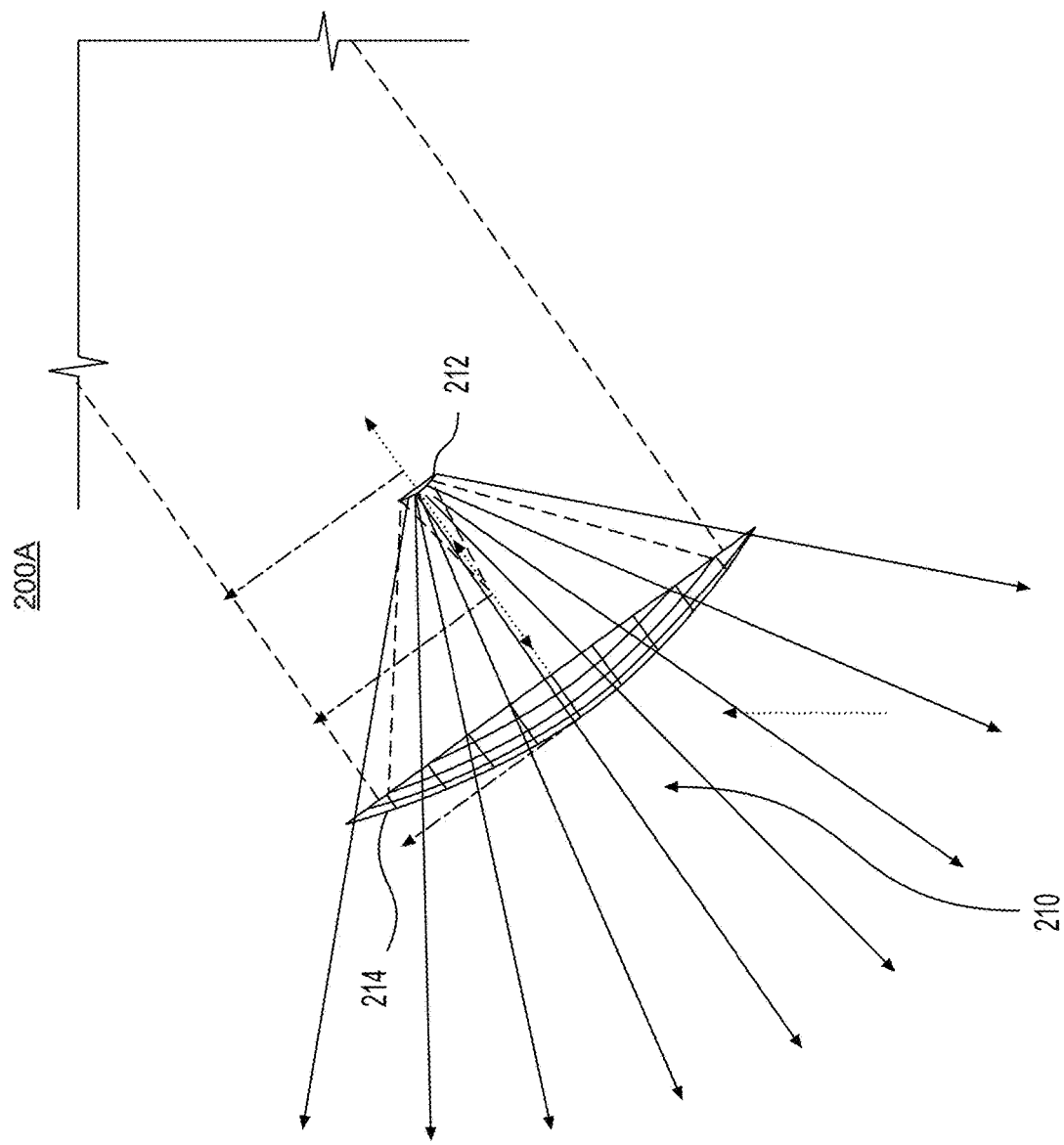

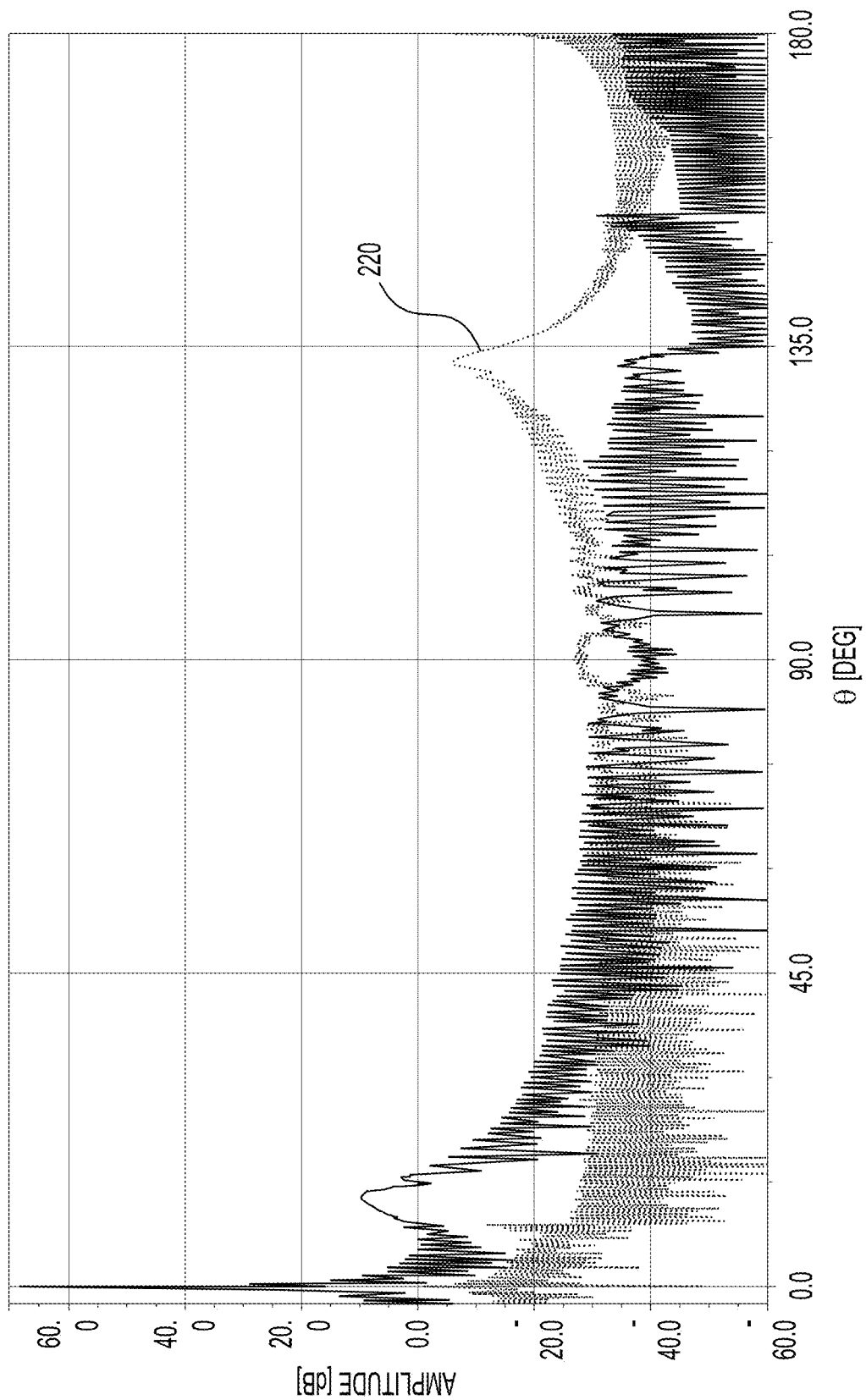

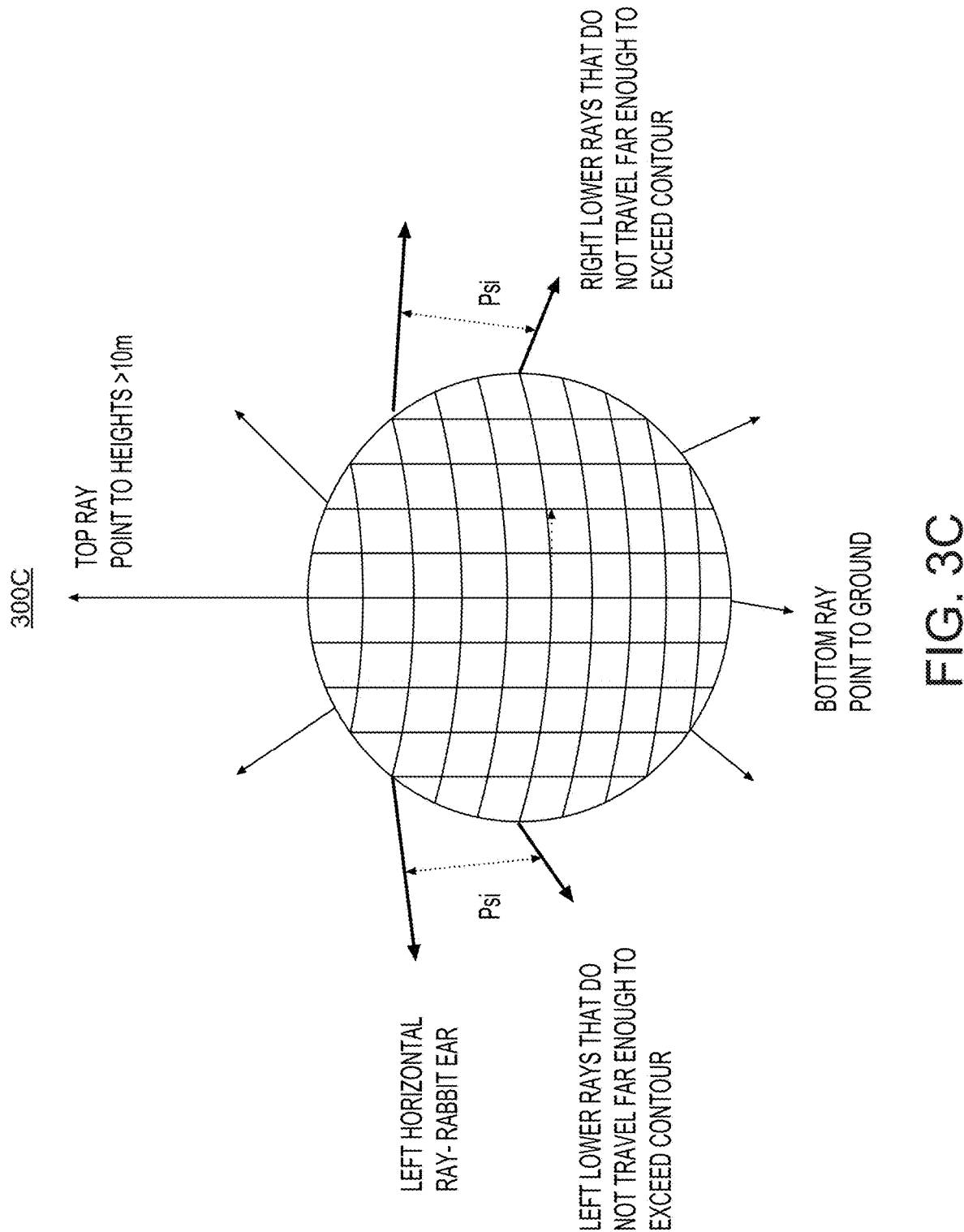

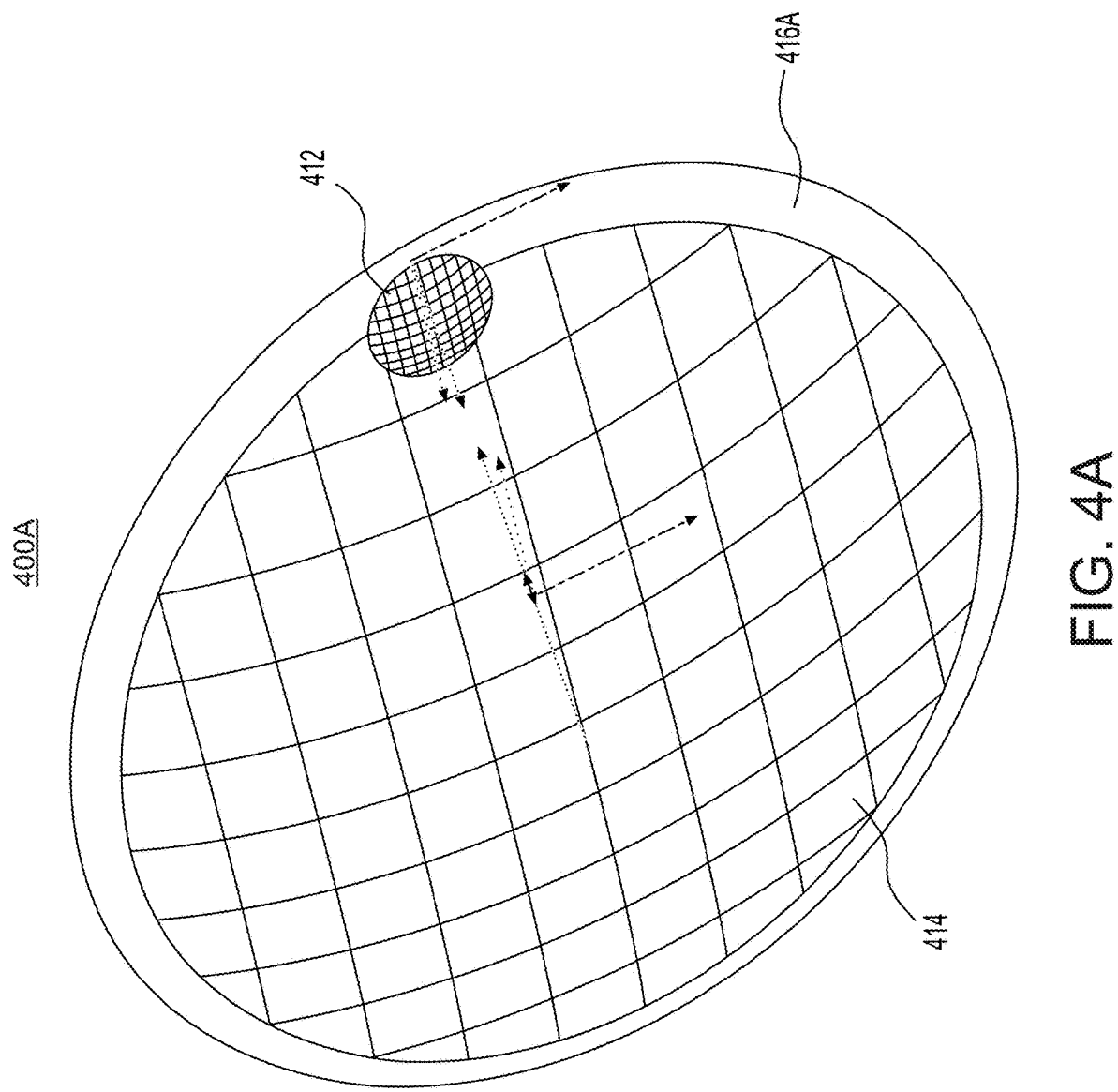

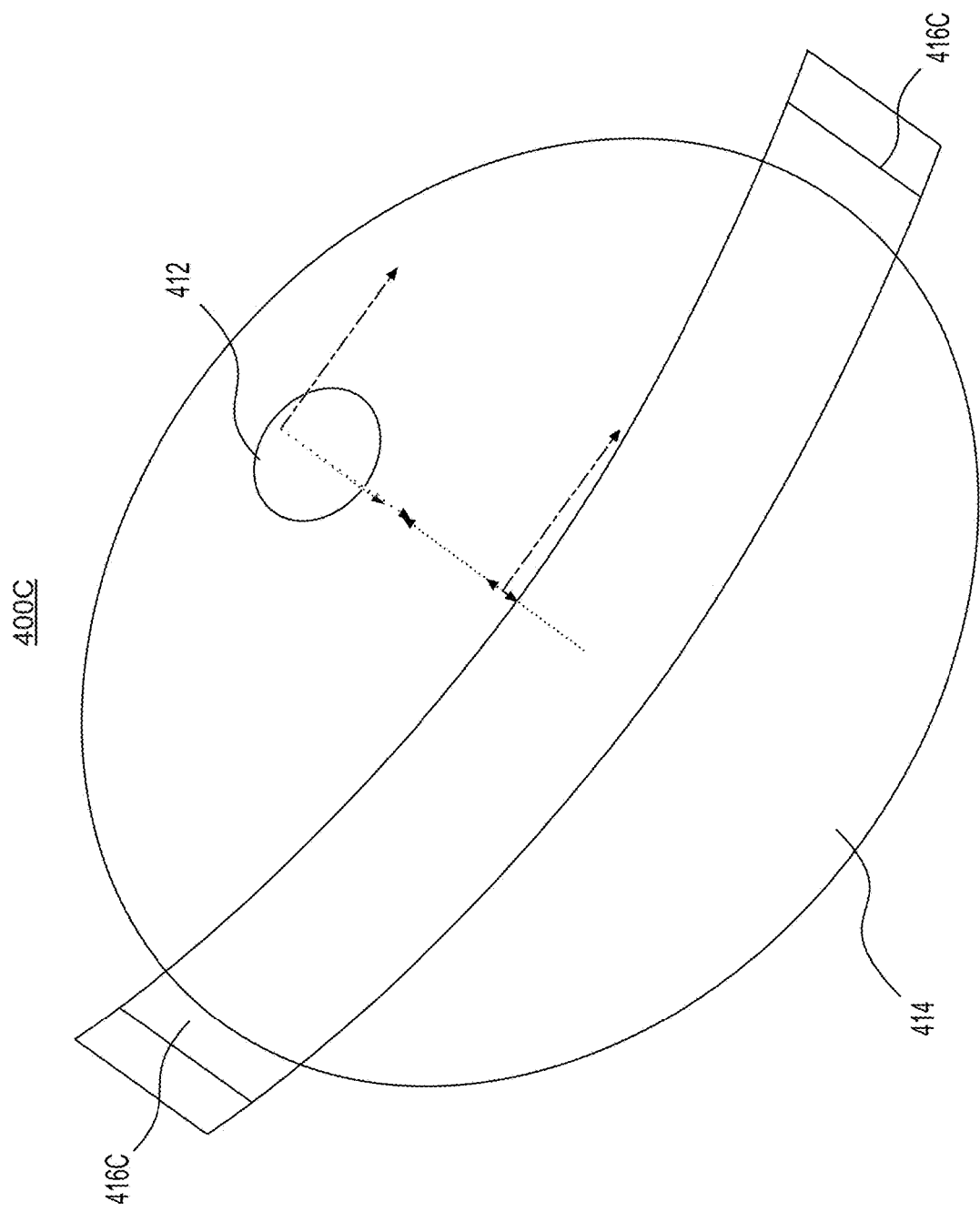

800

Provide an antenna terminal for a satellite communication system with a sub-reflector and a main reflector
810

Provide the main reflector with at least one of an antenna extension, a shroud, or a serrated edge
820

REDUCING REFLECTOR ANTENNA SPILLOVER LOBES AND BACK LOBES IN SATELLITE COMMUNICATION SYSTEMS

PRIORITY

This patent application claims priority to U.S. Provisional Patent Application No. 63/111,494, entitled "Reducing Reflector Antenna Spillover Lobes and Black Lobes in Satellite Communication Systems," filed on Nov. 9, 2020, which is hereby incorporated by reference herein in its entirety.

TECHNICAL FIELD

This patent application is directed to satellite communication systems, and more specifically, to systems and methods for reducing reflector antenna spillover lobes and back lobes in earth-station antennas of satellite communication systems.

BACKGROUND

Advances in telecommunications technologies are providing consumers with more access to voice and data services. Satellite communication systems may be used to provision voice and data services. However, as telecommunications technologies continue to advance, satellite communication systems must adapt to increasing consumer demand, as well as comply with a multitude of regulatory requirements. At times, these regulatory laws or standards may create additional technical challenges.

Earth-station antennas used by satellite communication systems, for example, may be required to comply with stringent antenna performance requirements aimed at limiting or preventing interference in the shared spectrum between satellite communications and cellular communications. For instance, earth-station antennas may be required by law to find technical solutions to shrink interference contours by lowering side lobes in general, but to also lower spillover side lobes, which may present any number of technical challenges. In addition, for antennas that operate at lower elevation angles, lowering back lobes may also be required, otherwise these back lobes may cast an undesirable long power flux density (PFD) tail.

BRIEF DESCRIPTION OF DRAWINGS

Features of the present disclosure are illustrated by way of example and not limited in the following Figure(s), in which like numerals indicate like elements, in which:

FIGS. 2A-2B illustrates antenna spillover for an antenna in a satellite communications system, according to an example.

FIGS. 3A-3C illustrates antenna spillover lobes and back in a satellite communications system, according to an example.

FIG. 4A-4D illustrates antenna configurations using antenna extensions for reducing reflector antenna spillover lobes and back lobes in earth-station antennas, according to an example.

DETAILED DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Figure 1:
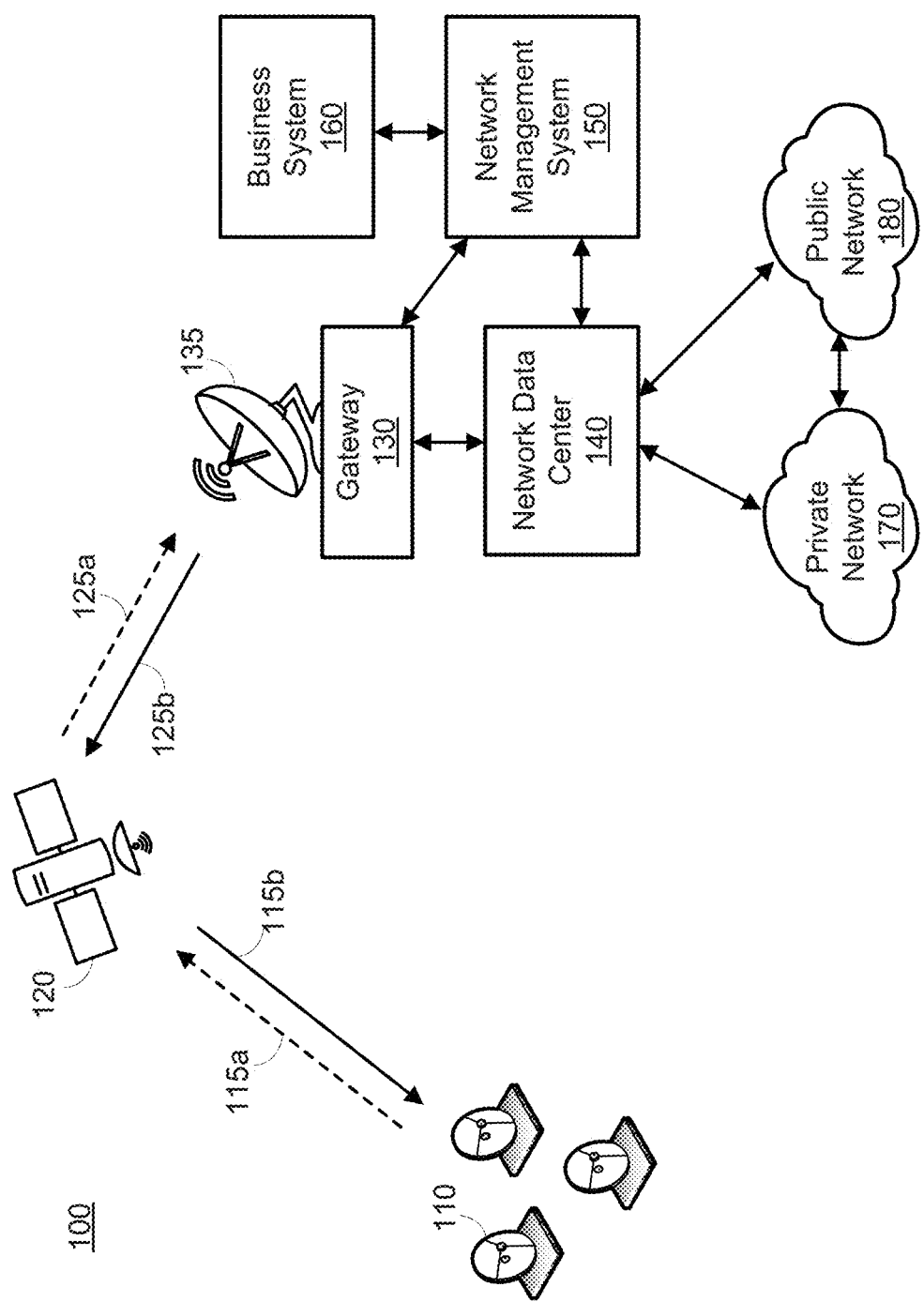
FIG. 1 illustrates satellite communication system for reducing reflector antenna spillover lobes and back lobes in earth-station antennas, according to an example.

FIG. 1 illustrates satellite communication system for reducing reflector antenna spillover lobes and back lobes in earth-station antennas, according to an example. In some examples, the system 100 may depict a satellite communication system capable of providing at least voice and/or data services. In some examples, the satellite communication system may be a high throughput satellite (HTS) system. The system 100 may include any number of terminals 110, a satellite 120, a gateway 130, a network data center 140, a network management system (NMS) 150, a business system 160, or other various system elements or components. The system 100 may also include a private network 170 and/or public network 180. It should be appreciated that the system 100 depicted in FIG. 1 may be an example. Thus, the system 100 may or may not include additional features and some of the features described herein may be removed and/or modified without departing from the scopes of the system 100 outlined herein.

The terminals 110 may be any variety of terminals. For example, the terminals 110 may be earth-station antennas or terminals or customer terminals, such as very small aperture terminals (VSATs). It should be appreciated that terminals 110 may be mounted on a structure, habitat, or other object or location. Depending on application, the terminals 110 may include or incorporate any number of antenna dishes, which may be provided in various sizes, depths, or dimensions (e.g., small, medium, large, etc.). Although the terminals 110 may typically remain in the same location once mounted, the terminals 110 may be removed from their mounts, relocated to another location, and/or may be configured to be mobile terminals. For instance, the terminals 110 may be mounted on mobile platforms that facilitate transportation thereof from one location to another. Such mobile platforms may include, for example, any number of mobile vehicles, such as cars, buses, boats, planes, etc. It should be appreciated that such terminals 110 may generally be operational when still and not while being transported. That said, there may be scenarios where the terminals 110 may be transportable (mobile) terminals that remain operational during transit. As used herein, the terms "terminal," "satellite terminal," and/or "earth-station antenna" may be used interchangeably to refer to these terminal types.

It should be appreciated that any number of customer premise equipment (CPE) (not shown) may be communicatively coupled to the terminals 110. In some examples, the customer premise equipment (CPE) may include any number of computing or mobile devices. For example, such a computing or mobile device may include a laptop, a tablet, a mobile phone, an appliance, a camera, a sensor, a thermostat, a vehicle, a display, etc. In general, the customer premise equipment (CPE) may include, without limitation, any number of network-enabled computing devices, elements, or systems. It should be appreciated that a network of such devices may be commonly referred to as the "Internet of Things" (IoT).

The satellite 120 may be an object intentionally placed into orbit. In some examples, the satellite 120 may be an artificial satellite that is configured to transmit and receive data signals. For example, the satellite 120 may form one or more beams and provide connectivity between at least the terminals 110 and the gateway 130. More specifically, the satellite 120 may communicate data signals using these beams with the terminals 110 via a terminal return channel 115a and a terminal forward channel 115b, and with the gateway 130 via a gateway return channel 125a and a gateway forward channel 125b. It should be appreciated that the satellite 120 may form any number of beams to communicate data signals with any number of components, even beyond the terminals 110 or the gateway 130 as shown.

In some examples, the satellite 120 may be a communication satellite, such as a high-throughput satellite, which may include any satellite that is capable of providing at least twice (e.g., 20+ times, 100+ times, etc.) the total amount of throughput as a classic fixed-satellite service (FSS) satellite. In some examples, the satellite 120 may include, but not limited to, a transponder satellite, a regenerative satellite, and/or other similar satellite that may generate one or more spot beams. Furthermore, in some examples, the satellite 120 may operate in geosynchronous, mid-earth, low-earth, elliptical, or some other orbital configuration.

The gateway 130 may include or be communicatively coupled to a transceiver 135, such as a radio frequency transceiver (RFT). The transceiver 135 may include an antenna unit of any type (e.g., transmitter, receiver, communication element, etc.), which may transmit and receive signals. The antenna unit may also include an earth-station antenna for reducing antenna spillover as described herein. In some examples, the transceiver 135 may be useable, by the gateway 130 of system 100, to transmit and receive data from the terminals 110, via communications from the satellite 120, and may be configured to route data and traffic from these terminals 110 to any other element or component in the system 100, such as the network data center 140 and/or network management system (NMS) 150. The gateway 130 may be further configured to route traffic to and from the public network 180 and/or private network 170 across the satellite communication channels 115a, 115b, 125a, or 125b to any terminal 110, which would then provide data communications or route traffic to any customer premise equipment (CPE) (not shown) associated with the terminal 110. Although depicted as a single element, the gateway 130 may include a single gateway, multiple gateways residing locally or remotely, in full or in part, relative to the other system components.

The network data center 140 may be communicatively coupled to the gateway 130, as well as other system components, such as the network management system (NMS) 150, private network 170, and/or public network 180. In some examples, the network data center 140 may be a satellite network data center that is configured to perform protocol processing and bandwidth allocation for gateway traffic and/or terminal communications in the served beams. An internet protocol gateway (IPGVV) (not shown) of the network data center 140 may help facilitate a traffic processing function, which may allow forwarding and protocol processing between external public networks and private networks (e.g., private network 170 and/or public network 180), and gateway communication channels. Although depicted in FIG. 1 as a separate and distinct element, the network data center 140, in some examples, may be collocated and/or integrated, fully or partially, with the gateway 130, or may be positioned at some other location. Furthermore, although shown as a single element, the network data center 140, in some examples, may be include a plurality of network data centers that are local or remote, in full or in part, relative to the other system components. The network data center 140 and the gateway 130 may include many other functions not directly referenced in this description and therefore omitted for clarity.

The network management system (NMS) 150, maintains, in full or in part, various information (configuration, processing, management, etc.) for the gateway 130, and terminals 110 and beams supported by the gateway 130. It should be appreciated that the network management system (NMS) 150 may or may not be co-located within the same physical structure as the gateway 130. Furthermore, the network management system (NMS) 150 may be single or a plurality distributed components that may be communicatively coupled to each other and/or with other system elements, such as the gateway 130 (e.g., using the previously described hardware and external networks). The network management system (NMS) 150 may, among other things, include a configuration manager or other similar management unit. The network management system (NMS) 150 may also include any number of reporting systems. As will be discussed in greater detail below, each of these multiple reporting systems may be configured to receive different information (e.g., reports) from the terminals 110. External reporting systems may also be configured to receive information (e.g., reports) from the terminals 110 by establishing a communication link with network management system (NMS) 150.

The business system 160, or other various system elements or components, may also be communicatively coupled to the network management system (NMS) 150 and/or gateway 130. In some examples, the business system 160 may include a virtual network operator (VNO), which may be configured to communicate with the gateway 130 and/or the network management system (NMS) 150 in order to monitor the status of its own terminals 110. More particularly, a virtual network operator (VNO), in some scenarios, may be a business or government entity, that may have access (by purchase or license) to a managed service and associated capacity from a satellite network operator in order to provide communication connectivity and/or communication for a privately-owned set of terminals 110. The virtual network operator (VNO) may therefore manage various aspects of such terminals 110 via the gateway 130 and/or the network management system (NMS) 150.

The private network 170 and/or public network 180 may include any variety of networks. For example, the private network 170 may be a local area network (LAN), and the public network 180 may be a wide area network (WAN). That said, the private network 170 and/or public network 180 may each also be a local area network (LAN), wide area network (WAN), the Internet, a cellular network, a cable network, a satellite network, or other network that facilitates communication between the components of system 100 as well as any external element or system connected to the private network 170 and/or public network 180. The private network 170 and/or public network 180 may further include one, or any number, of the exemplary types of networks mentioned above operating as a stand-alone network or in cooperation with each other. For example, the private network 170 and/or public network 180 may utilize one or more protocols of one or more clients or servers to which they are communicatively coupled. The private network 170 and/or public network 180 may facilitate transmission of data according to a transmission protocol of any of the devices and/or systems in the private network 170 and/or public network 180. Although each of the private network 170 and/or public network 180 is depicted as a single network in FIG. 1, it should be appreciated that in some examples, each of the private network 170 and/or public network 180 may include a plurality of interconnected networks as well.

While the processors, components, elements, systems, subsystems, and/or other computing devices may be shown as single components or elements, one of ordinary skill in the art would recognize that these single components or elements may represent multiple components or elements, and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the system 100 and their components, as shown in FIG. 1.

The systems and methods described herein may reduce reflector antenna spillover lobes and back lobes in earth-station antennas (e.g., antennas of terminals 110 or antennas of gateways 130) of satellite communication systems (e.g., system 100). As described above, satellite communication systems must continue to adapt to increasing consumer demand, as well as comply with a multitude of regulatory requirements. These regulatory laws or standards may create additional technical challenges.

For example, all ground-based antennas used in satellite communication systems must comply with regulatory requirements issued by the Federal Communications Commission (FCC), a government agency that regulates communications by radio, television, wire, satellite, and cable across the United States. More specifically, all earth-station antennas deployed in the U.S., Canada, and Mexico must comply with the FCC specifications, such as the FCC § 25.209 *"Antenna Performance Standard."* Earth-station antennas used by satellite communication systems may be required to comply with stringent antenna performance requirements aimed at limiting or preventing interference in the shared spectrum between satellite communications and cellular communications.

For instance, the FCC has recently created a new service allocation, called the Upper Microwave Flexible Use Service (UMFUS), which includes the emerging 5G cellular communications systems, that shares the same spectrum as satellite communication systems. In anticipation of potential interference between the terminals 110 of FIG. 1 (e.g., earth-station antennas) and the new UMFUS systems due to a sharing or overlapping of spectrum, the FCC has issued new performance rules for the earth-station antennas. These rules are outlined in section § 25.136, entitled "Earth Stations in the 24.75-25.25 GHz, 27.5-28.35 GHz, 37.5-40 GHz, 47.2-48.2, GHz and 50.4-51.4 GHz bands."

These standards set much lower PFD (power flux density) limits regarding the unintentional radiation over vicinity of an antenna site, especially when compared to existing antenna performance standards and PFD limits and rules. This unintentional radiation may be referred to as "antenna spill-over," which may be energy that does not get intercepted by a reflector of the antenna of a terminal 110, gateway 130, or other satellite communications element using an antenna within the purview of the FCC regulation or other similar governing body.

FIG. 2A illustrates an antenna side view 200A depicting antenna spillover in a satellite communications system, according to an example. As shown, signals depicted as arrows in the antenna side view 200A may be intercepted by a sub-reflector 212 and/or a main reflector 214. Antenna spillover 210 may include any radio frequency (RF) energy from a sub-reflector 212 that is not intercepted by the main reflector 214, as shown in the antenna side view of FIG. 2A. For example, this may further include a cone of rays grazing slipping from a rim of the main reflector 214.

Figure 3A:
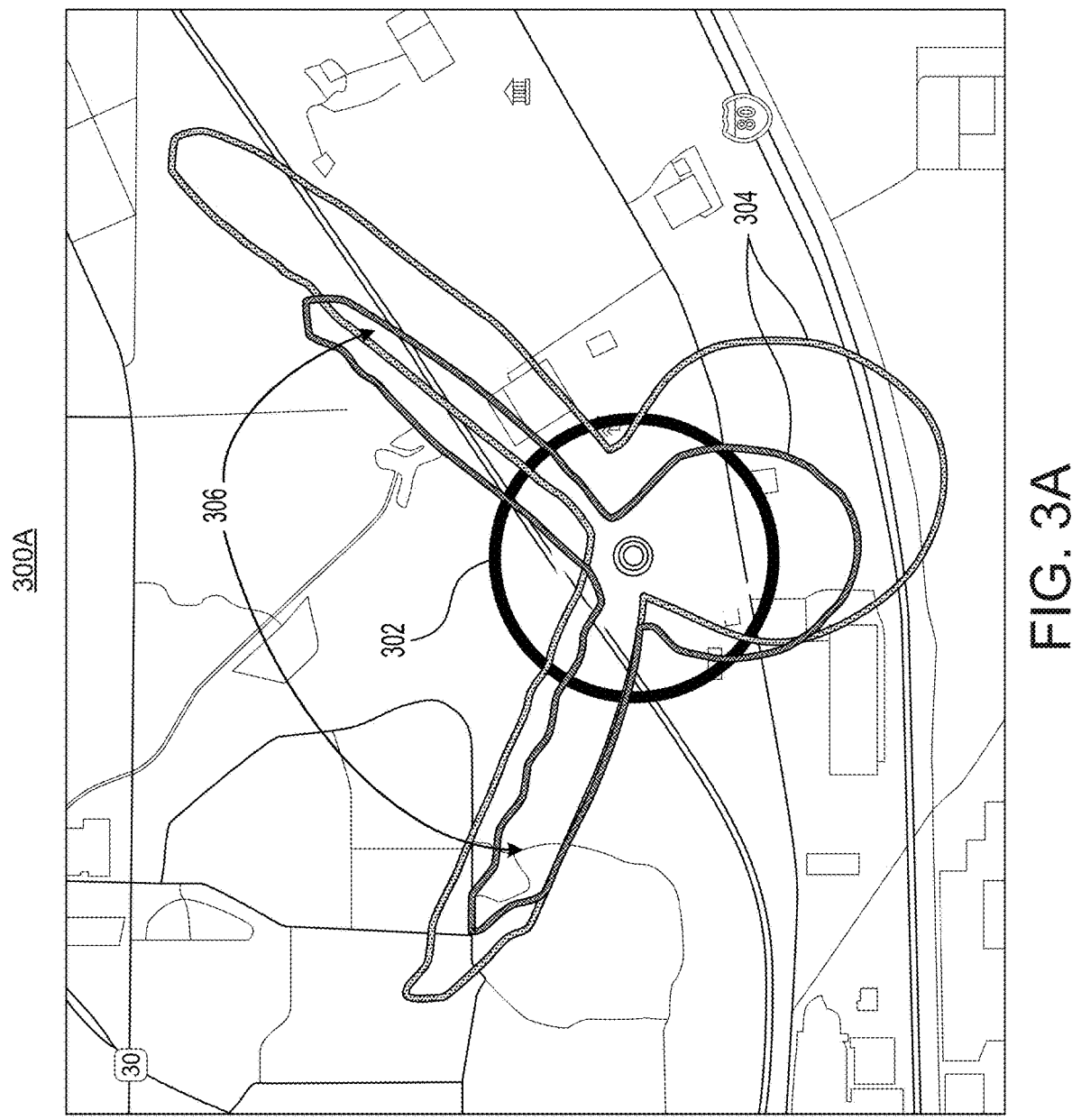

FIG. 2B illustrates a graph 200B depicting the antenna spillover 210 of FIG. 2A in a satellite communications system, according to an example. As shown, an analysis of a spectrum corresponding to the antenna spillover may reveal a spillover lobe 220 that corresponds to the antenna spillover 210 of FIG. 2A. Recent updates to FCC regulations change the permissible antenna spillover. For example, FIG. 3A illustrates a plan view 300A that compares the −77.6 dB/m$^2$/MHz power flux density (PFD) contours at 10 meters above ground level under the existing FCC rules vs. the new FCC rules. As shown, the contour (black circle or ring) 302 under existing FCC rules does not have the lobes (e.g., "rabbit ears") 306 of the contours 304 under the new FCC rules.

Figure 3B:
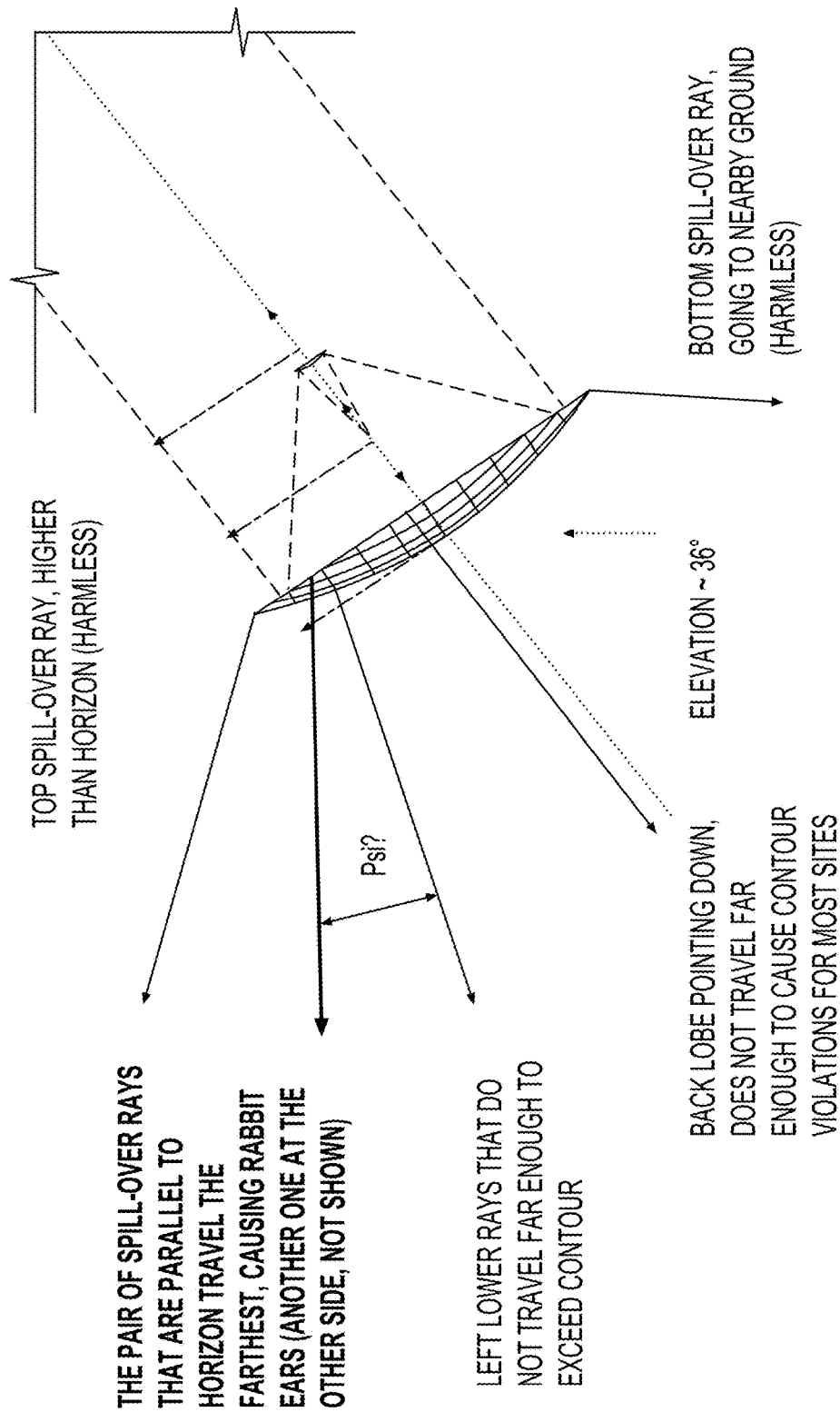

FIGS. 3B-3C illustrate an antenna views 300B-300C depicting antenna spillover lobes and back lobes in a satellite communications system, according to an example. As shown in FIG. 3B, an antenna side view 300B is provided. As shown, there may be top spillover (higher than horizon line) and bottom spillover (below horizon line) that hits the nearby ground. Both of these may not produce energy at 10 meters above ground level. However, there are a pair of spillover rays that are parallel to horizon line and travel quite far (darkened arrows), that may cause the "rabbit ears" of the undesirable contours at 10 meters described above. FIG. 3C illustrates an antenna rear view 300C depicting antenna spillover lobes and back lobes in a satellite communications system, according to an example. In this view 300C, it may be easier to see the left and right horizontal rays that case the "rabbit ears, and the Psi that correspond range of deviation of such horizontal spillover. As shown in both views 300B and 300C, there may also be back lobes of the antenna spillover that point down and do not travel far, but may still cause contour "deformities" that are violative of these FCC rules.

As described above, these earth-station antennas may be required by regulation to find technical solutions to shrink interference contours. For antennas that operate at lower elevation angles, a lower back lobe may also be required, otherwise the back lobe may cast an undesirable long power flux density (PFD) tail.

Some conventional solutions to reduce antennas spillover and/or back-lobes, that do not inadvertently affect the antenna gain or efficiency, may involve the use of shields and baffles. These may include RF shields or baffles, which may be in the form of screens or walls, which may be erected in the vicinity of the antenna, to block the unwanted radiation, in the direction of the spillover and/or back-lobes.

The problem with these and other related solutions is that these distinct and independent structures take up additional real estate and generally need to be tall (higher than the highest point of the antenna) and wide (wider than the PFD exceedance in terms of degrees). As a result, these shields and barriers tend to be quite costly to construct and/or require additional real estate that may not be readily available in densely populated areas. Beyond size, cost, and form factor, these solutions often create an unacceptable aesthetic that is not received well. Furthermore, these conventional solutions may be in violation of additional local bylaws and/or home associations' covenants or ordinances.

The systems and methods described herein may provide reductions in the antenna spillover and back-lobes without sacrificing antenna efficiency or gain. In some examples, the systems and methods described herein may use novel antenna configurations based on reduced form factor shields that do not require additional real estate but may be attached to or otherwise associated with the antenna itself. For example, the antenna may include extensions, shrouds, or edge serrations to reduce antenna spillover and minimize side and back lobes, and ultimately creating contours that are in compliance with current rules set forth by the FCC and/or other governing bodies. These antenna configurations may minimize need for distinct and separate shields that are large, cumbersome, and expensive to construct. Instead, the systems and methods described herein may use much smaller extensions, shrouds, and/or edge serrations to provide a similar "shielding" effect. Because the novel extensions, shrouds, and/or edge serrations are either on or attached to the antenna itself, they can be much smaller and still block the unwanted radiation over the same geographic area as that of the conventional varieties.

In addition, these extensions, shrouds, and/or edge serrations may be provided in any variety of configurations, such as full or partial, and in a variety of dimensions and sizes to provide a customized solution to shielding unwanted radiation and thereby reducing antenna spillover. As will be appreciated from the description provided herein, the systems and methods reduce antenna spillover at lower costs, lower added wind load caused by conventional shields or baffles, not subjected by local bylaws, HOA covenants or ordinances, and without using additional real estate that would otherwise be required by conventional shields or baffles. Details of these antenna extensions, shrouds, and/or edge serrations will now be described in more detail below.

Figure 4B:
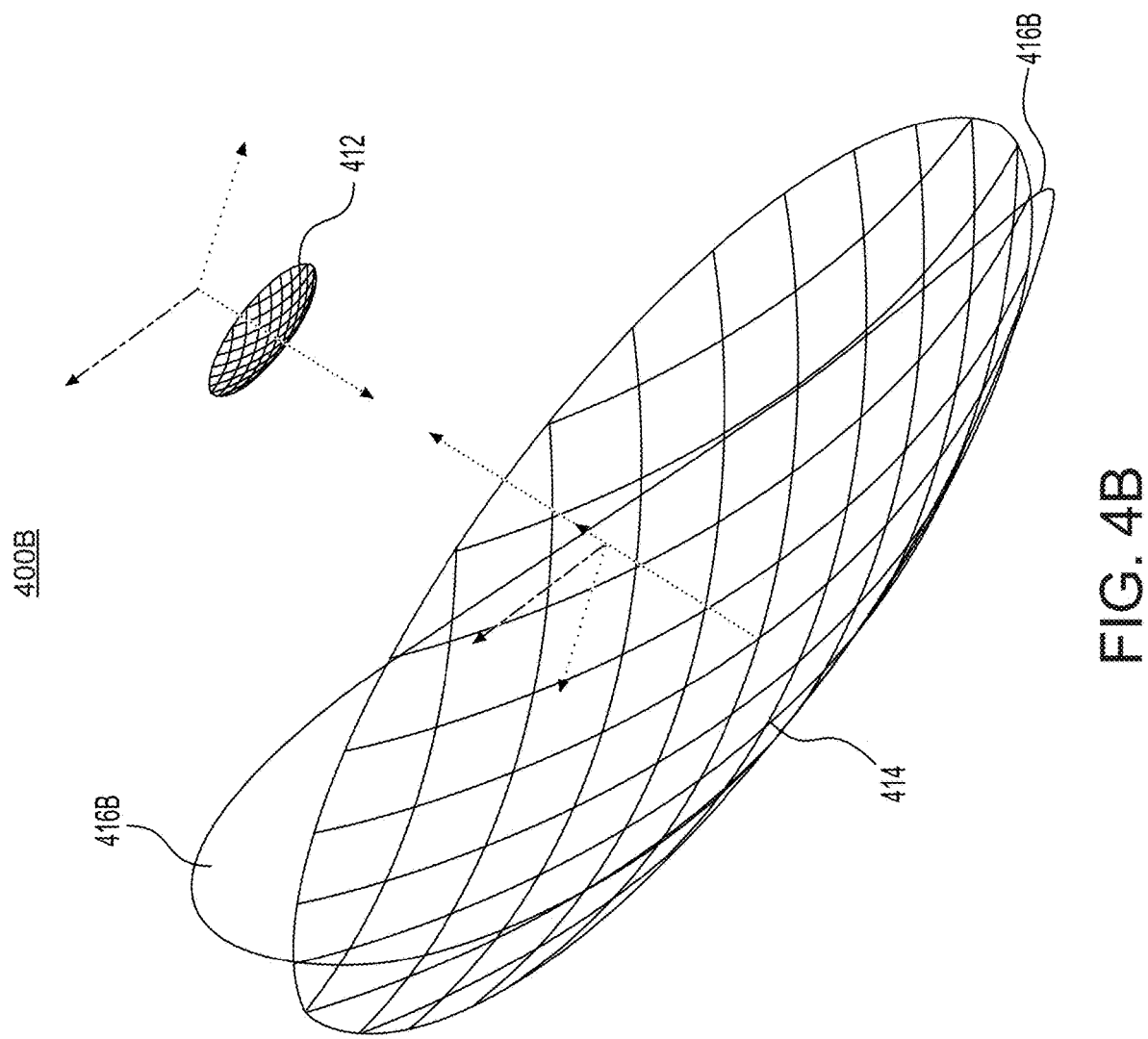

FIGS. 4A-4D illustrate antenna configurations 400A-400D using antenna extensions for reducing reflector antenna spillover lobes and back lobes in earth-station antennas, according to an example. FIG. 4A illustrates an antenna configuration 400A using a full antenna extension 416A for reducing reflector antenna spillover lobes and back lobes in earth-station antennas, according to an example. As shown, the antenna configuration 400A may include a sub-reflector 412 and a main reflector 414. The full antenna extension 416A (green) may be placed and attached to the rim of the main reflector 414 to prevent unwanted radiation and antenna spillover. In some examples, the full antenna extension 416A may include a 1-meter rim around the main reflector 414. This may render the main reflector 414 to roughly increase in diameter by about 2 meters. Thus, a 10-meter main reflector may be transformed to a 12-meter main reflector, increasing the total area from about 78.5 m$^2$ to 113 m$^2$. In other words, a 1-meter full antenna extension would create roughly an additional 34.5 m$^2$ of reflector surface. It should be appreciated that other various sizes and dimensions may also be provided. For example, the full antenna extension 416A may be smaller or greater than 1 meter.

Figure 4D:
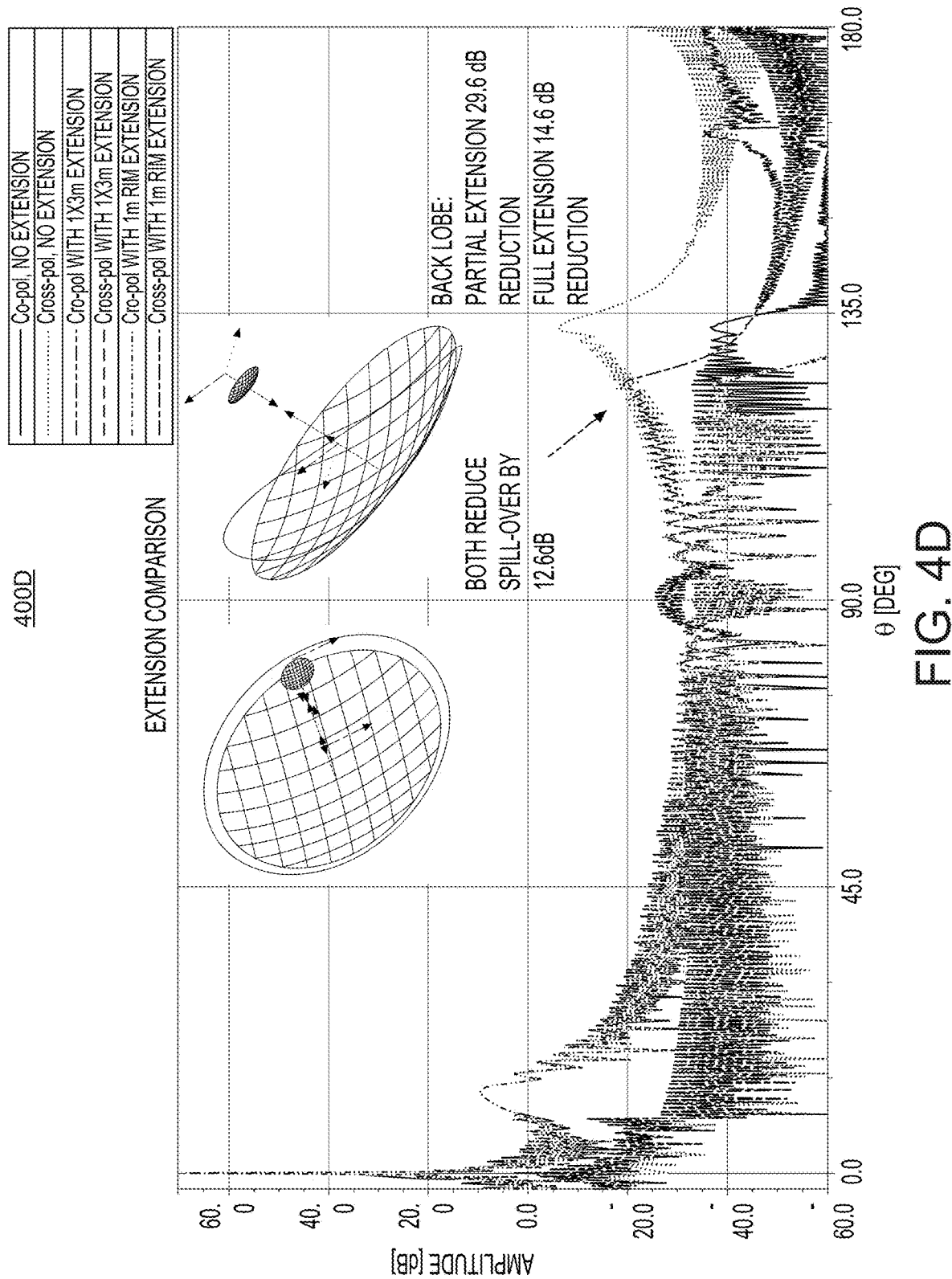

In the event that is undesirable to use a full antenna extension 416A, partial antenna extensions may also be provided. For example, FIGS. 4B-4C illustrate antenna configurations 400B-400C using partial antenna extensions for reducing reflector antenna spillover lobes and back lobes in earth-station antennas, according to an example. As shown in FIGS. 4B-4C, partial antenna extensions 416B and 416C may still be able to achieve similar antenna spillover side lobes. Here, the partial antenna extensions 416B and 416C may shield the areas of antenna spillover that create the "rabbit ears," as described above. For example, using partial antenna extensions, each with an approximate size of 1 m×3 m, may provide about 6 m$^2$ of area to achieve a similar reduction in spillover when compared to the full antenna extension, as shown in FIG. 4D. In some examples, the partial antenna extensions 416B and 416C may also reduce back lobe by as much as 30 dB in some scenarios, as shown in FIG. 4D. Furthermore, it should be appreciated that the partial antenna extensions 416B and 416C may come in a variety of shapes, sizes, and dimensions, as shown, in order to comply with certain antenna performance or any interference prevention rule or restriction.

FIG. 4A illustrates an antenna configuration 400A using a full antenna extension 416A for reducing reflector antenna spillover lobes and back lobes in earth-station antennas, according to an example. As shown, the antenna configuration 400A may include a sub-reflector 412 and a main reflector 414. The full antenna extension 416A may be placed and attached to the rim of the main reflector 414 to prevent unwanted radiation and antenna spillover. In some examples, the full antenna extension 416A may include a 1-meter rim around the main reflector 414. This may render the main reflector 414 to roughly increase in diameter by about 2 meters. Thus, a 10-meter main reflector may be transformed to a 12-meter main reflector, increasing the total area from about 78.5 m$^2$ to 113 m$^2$. In other words, a 1-meter full antenna extension would create roughly an additional 34.5 m$^2$ of reflector surface. It should be appreciated that other various sizes and dimensions may also be provided. For example, the full antenna extension 416A may be smaller or greater than 1 meter.

In the event that is undesirable to use a full antenna extension 416A, partial antenna extensions may also be provided. For example, FIGS. 4B-4C illustrate antenna configurations 400B-400C using partial antenna extensions for reducing reflector antenna spillover lobes and back lobes in earth-station antennas, according to an example. As shown in FIGS. 4B-4C, partial antenna extensions 416B and 416C may still be able to achieve similar antenna spillover side lobes. Here, the partial antenna extensions 416B and 416C may shield the areas of antenna spillover that create the "rabbit ears," as described above. For example, using partial antenna extensions, each with an approximate size of 1 m×3 m, may provide about 6 m² of area to achieve a similar reduction in spillover when compared to the full antenna extension. In some examples, the partial antenna extensions 416B and 416C may also reduce back lobe by as much as 30 dB in some scenarios. Furthermore, it should be appreciated that the partial antenna extensions 416B and 416C may come in a variety of shapes, sizes, and dimensions, as shown, in order to comply with certain antenna performance or interference prevention rule or restriction, and should not be limited by the dimensions described herein, which are provided as examples.

Figure 5A:
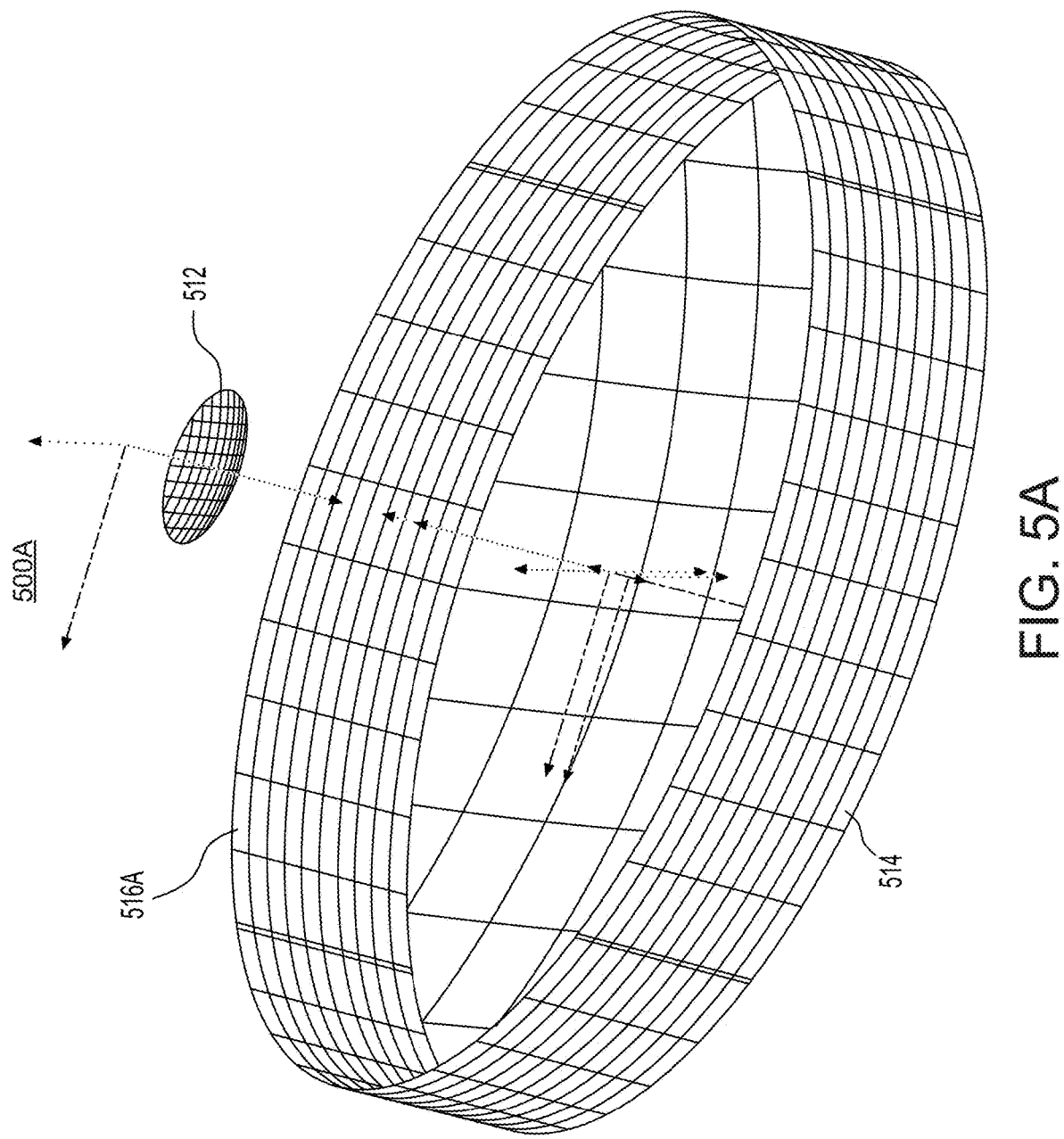
FIG. 5A-5B illustrates antenna configurations using shrouds for reducing reflector antenna spillover lobes and back lobes in earth-station antennas, according to an example.
Figure 5B:
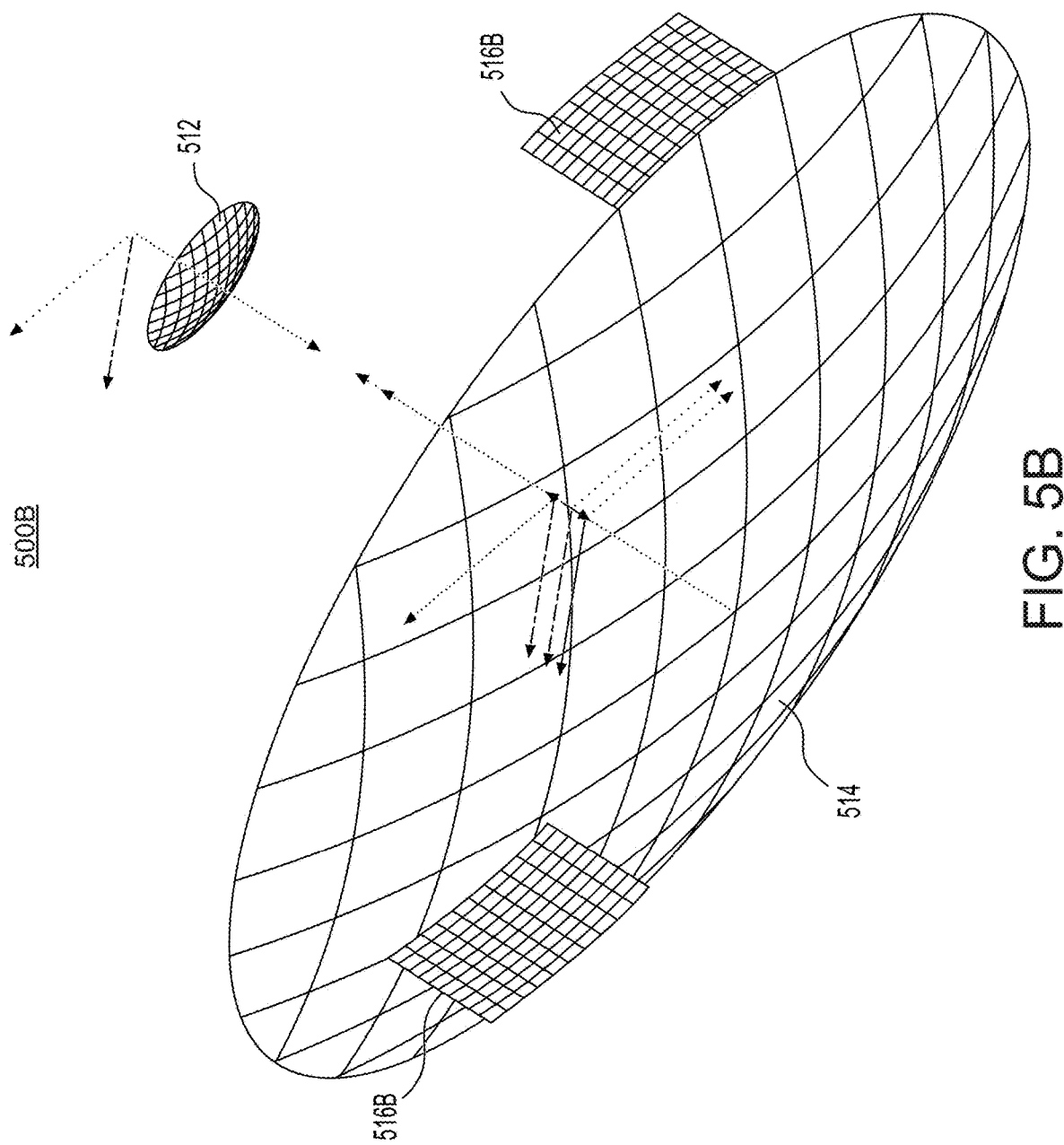

In the event use of antenna extensions are undesirable, antenna shrouds may be provided. FIG. 5A-5B illustrates antenna configurations 500A-500B using shrouds for reducing reflector antenna spillover lobes and back lobes in earth-station antennas, according to an example. FIG. 5A illustrates an antenna configuration 500A using a full antenna shroud 516A for reducing reflector antenna spillover lobes and back lobes in earth-station antennas, according to an example. As shown, the antenna configuration 500A may include a sub-reflector 512 and a main reflector 514. The full antenna shroud 516A may be placed and attached to the rim of the main reflector 514 to prevent unwanted radiation and antenna spillover, similar to the extensions described above. In some examples, the full antenna shroud 516A may include a 1.5-meter deep shroud around the main reflector 514. This create a 47.1 m² area around the main reflector 514 to help prevent stray or unwanted radiation to spillover. It should be appreciated that other various sizes and dimensions may also be provided. For example, the full antenna shrouds 516A may be smaller or greater than 1 meter.

In the event that is undesirable to use a full antenna shroud 516A, partial antenna shrouds may also be provided. For example, FIG. 5B illustrates an antenna configuration 500B using partial antenna shrouds 516B for reducing reflector antenna spillover lobes and back lobes in earth-station antennas, according to an example. As shown in FIG. 5B, partial antenna shrouds 516B may still be able to achieve similar antenna spillover side lobes. Here, the partial antenna shrouds 516B may shield the areas of antenna spillover that create the "rabbit ears," as described above. For example, using partial antenna shrouds, each with an approximate size of 1.5 m×2 m, may provide about 6 m² of area to achieve a similar reduction in spillover when compared to the full antenna extension. Similar to the partial antenna extensions of FIGS. 4B-4C, the partial antenna shrouds 516B may also reduce back lobe by as much as 30 dB in some scenarios. Furthermore, it should be appreciated that the partial antenna shrouds 516B may come in a variety of shapes, sizes, and dimensions, as shown, in order to comply with certain antenna performance or interference prevention rule or restriction, and should not be limited by the dimensions described herein, which are provided as examples.

Figure 5C:
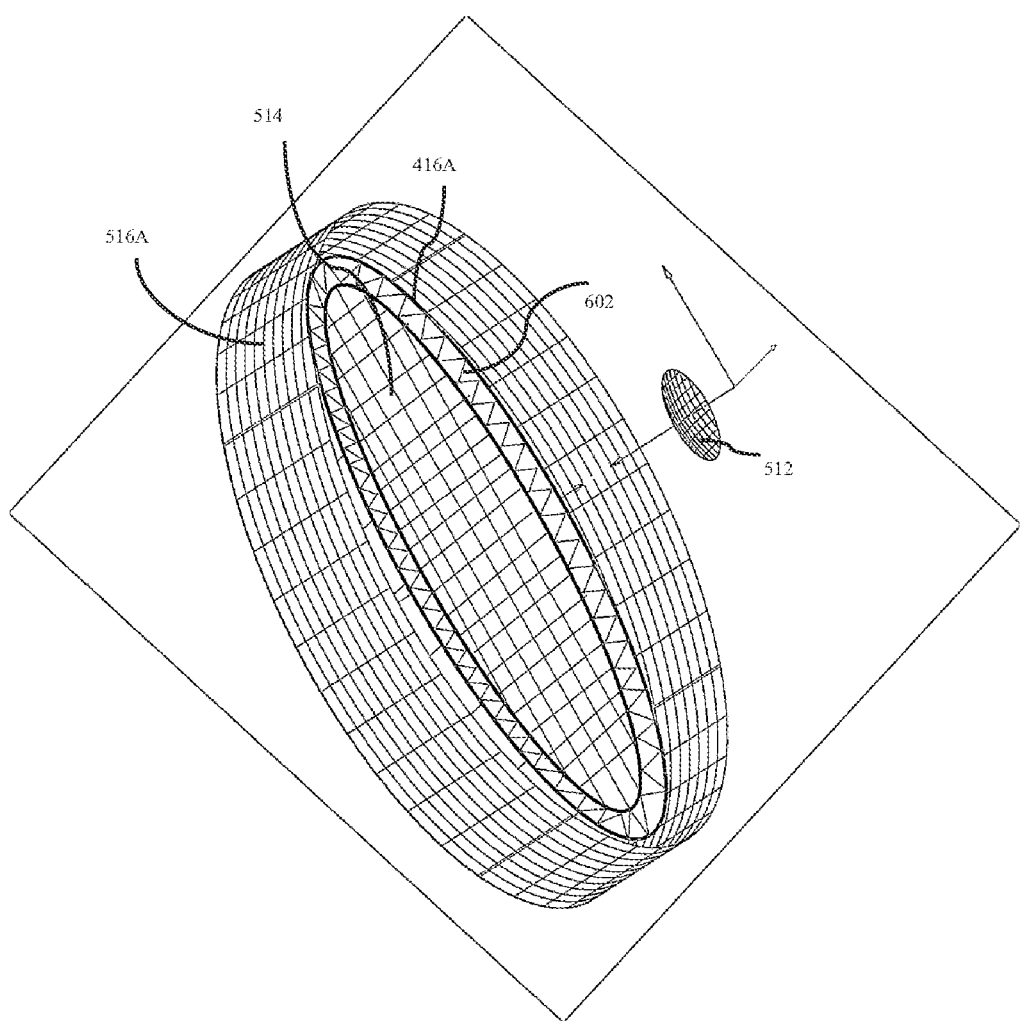
FIGS. 5C-5D illustrate antenna configurations using shrouds for reducing reflector antenna spillover lobes and back lobes in earth-station antennas, according to an example.
Figure 5D:
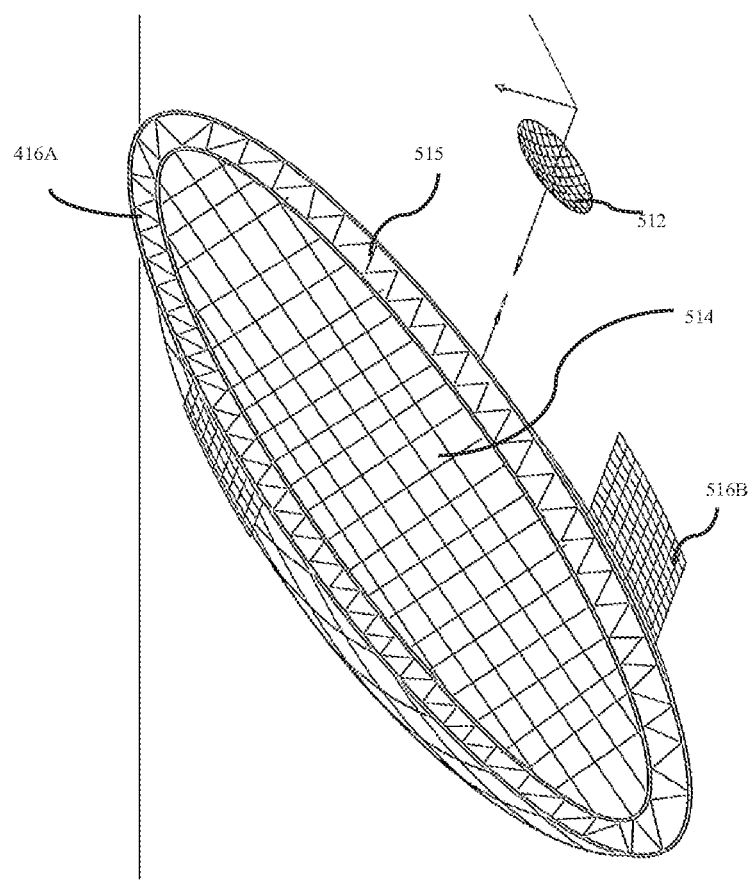

FIGS. 5C-5D illustrates antenna configurations using shrouds for reducing reflector antenna spillover lobes and back lobes in earth-station antennas, according to an example. FIG. 5C illustrates an antenna configuration 500C using a full antenna shroud 516A for reducing reflector antenna spillover lobes and back lobes in earth-station antennas, according to an example. As shown, the antenna configuration 500C may include a sub-reflector 512 and a main reflector 514. The full antenna shroud 516A may be placed and attached to the rim of the main reflector 514 to prevent unwanted radiation and antenna spillover, similar to the extensions described above. In some examples, the antenna configuration 500C may include a full antenna extension 416A such as those shown in FIG. 4A. Alternatively, the antenna configuration 500C may include a partial antenna extension 416B such as those shown in FIG. 4B. Further, in some examples, the antenna configuration 500C may include edge serrations 515. FIG. 5D illustrates an antenna configuration 500D using partial antenna shrouds 516B for reducing reflector antenna spillover lobes and back lobes in earth-station antennas, according to an example. As shown, the antenna configuration 500CD may include a sub-reflector 512 and a main reflector 514. The partial antenna shroud 516B may still be able to achieve similar antenna spillover side lobes. Here, the partial antenna shrouds 516B may shield the areas of antenna spillover that create the "rabbit ears," as described above. In some examples, the antenna configuration 500D may include a full antenna extension 416A such as those shown in FIG. 4A. Alternatively, the antenna configuration 500D may include a partial antenna extension 416B such as those shown in FIG. 4B. Further, in some examples, the antenna configuration 500D may include edge serrations 515.

Figure 6A:
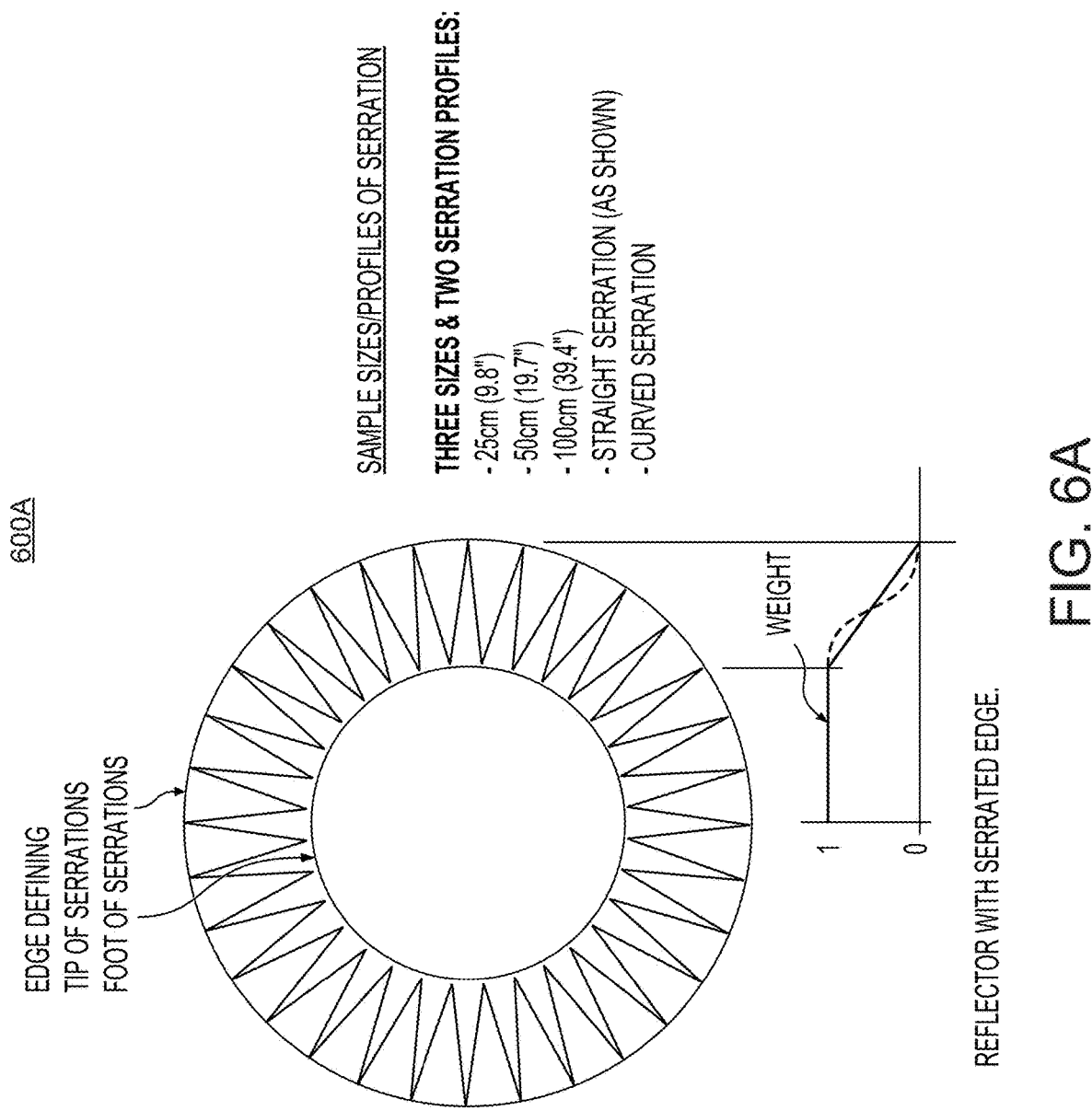
FIG. 6A illustrates an antenna configuration using a reflector with edge serration for reducing reflector antenna spillover lobes and back lobes in earth-station antennas, according to an example.

In some examples, a main reflector of an antenna may include edge serrations. FIG. 6A illustrates an antenna configuration 600A using a reflector with edge serration for reducing reflector antenna spillover lobes and back lobes in earth-station antennas, according to an example. As shown, an edge serration may include edge defining tips of serrations and foot of serrations. The size of serration definition may also vary depending on application. As shown in FIG. 6A, the main reflector may use at least three different sizes and two serration profiles as simulation examples: 25 cm (9.8 inches), 50 cm (19.7 inches), 100 cm (39.4 inches), straight edge serration (as shown), and/or curved edge serration (which in some simulations may be more effective for back lobe cancellation). Other various sizes, shapes, and dimensions may also be provided. Each of these various sizes and configurations will now be described in detail.

Figure 6B:
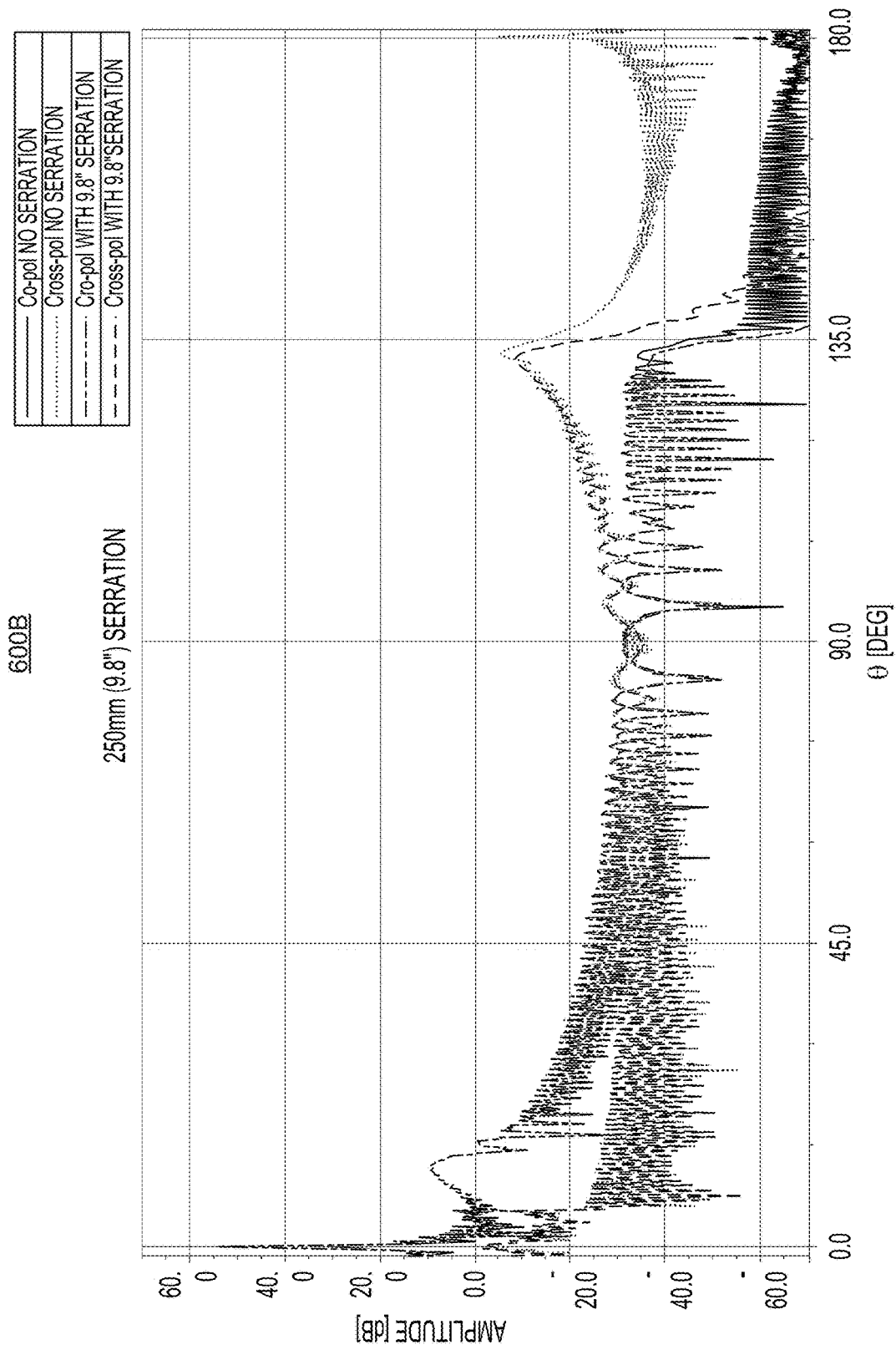
FIG. 6B-6G illustrates graphs of various antenna configurations using a reflector with edge serration for reducing reflector antenna spillover lobes and back lobes in earth-station antennas, according to an example.

FIG. 6B-6G illustrates graphs 600B-600G of various antenna configurations using a reflector with edge serration for reducing reflector antenna spillover lobes and back lobes in earth-station antennas, according to an example. FIG. 6B illustrates a graph 600B of a 25-cm (9.8 inches) straight edge serration for reducing reflector antenna spillover lobes and back lobes in earth-station antennas, according to an example. As shown in graph 600B, this particular configuration may yield a 2.9 dB reduction in side lobe spillover, mainly due to the larger effective reflector diameter, and a 49 dB reduction in back lobe spillover due to serrations break phase cohesion.

Figure 6C:
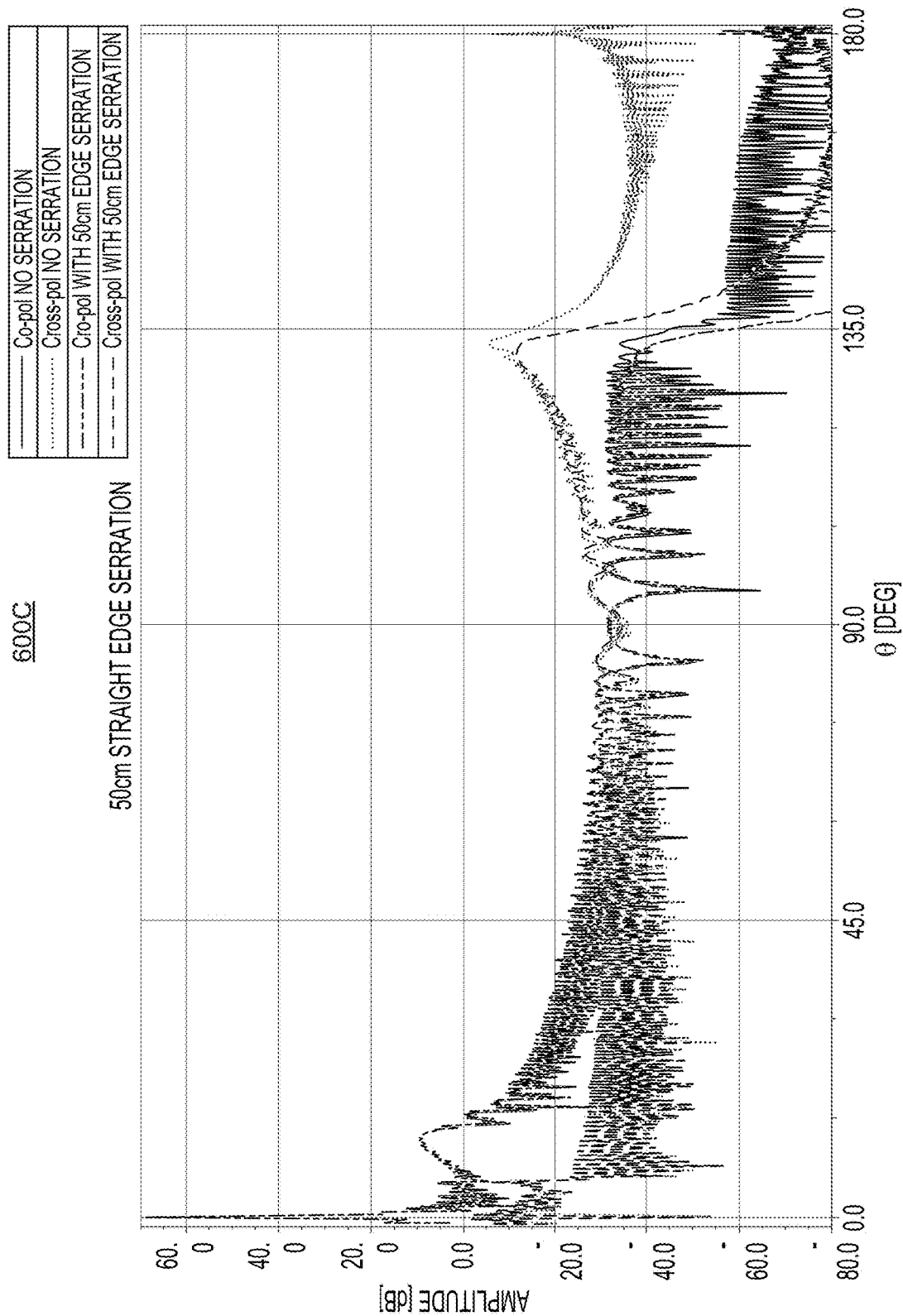

FIG. 6C illustrates a graph 600C of a 50-cm (19.7 inches) straight edge serration for reducing reflector antenna spillover lobes and back lobes in earth-station antennas, according to an example. As shown in graph 600C, this particular configuration may yield a 6.2 dB reduction in side lobe spillover, mainly due to the larger effective reflector diameter, and a 51 dB reduction in back lobe spillover due to serrations break phase cohesion.

Figure 6D:
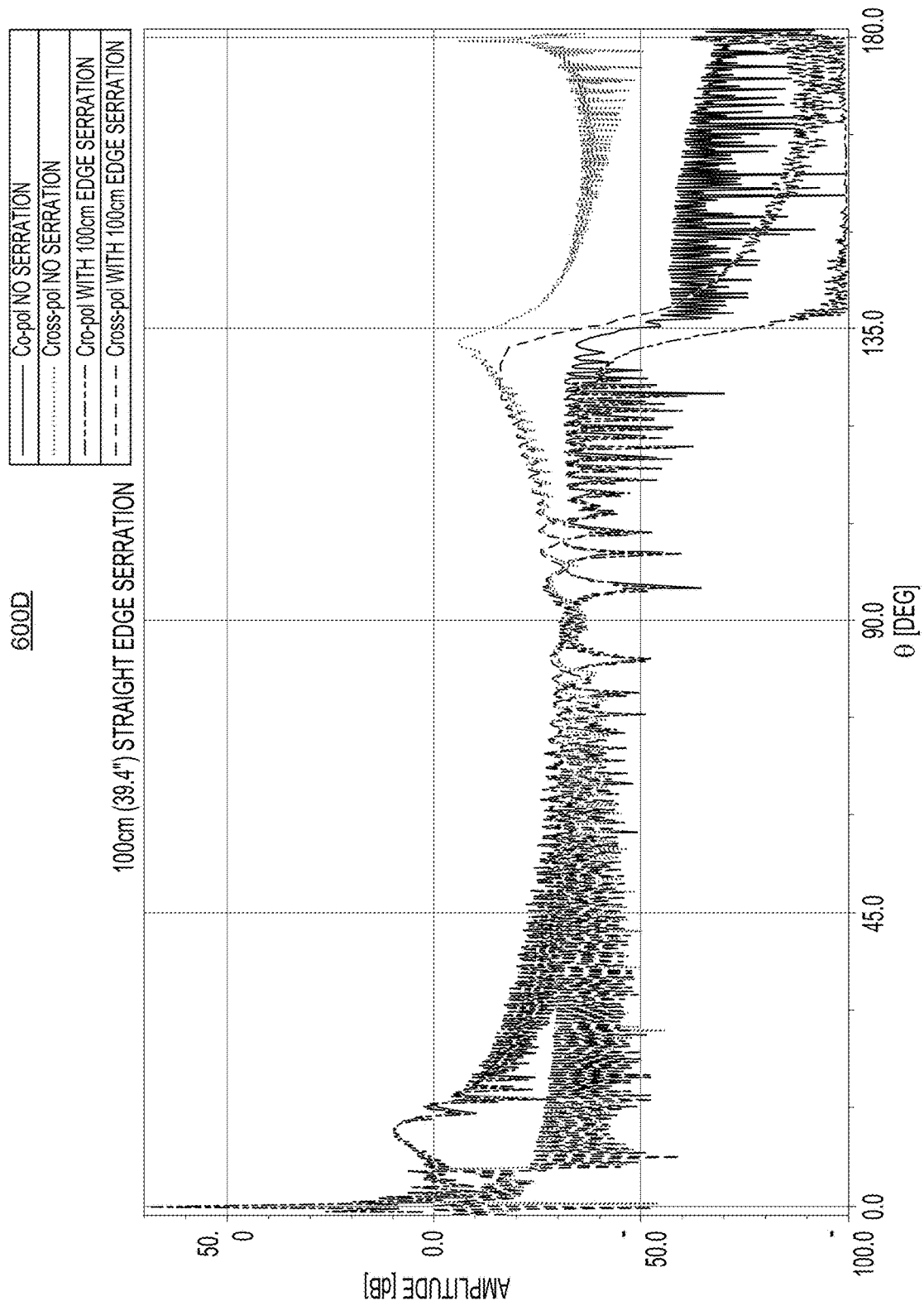

FIG. 6D illustrates a graph 600D of a 100-cm (39.4 inches) straight edge serration for reducing reflector antenna spillover lobes and back lobes in earth-station antennas, according to an example. As shown in graph 600D, this particular configuration may yield a 10.6 dB reduction in side lobe spillover, mainly due to the larger effective reflector diameter, and a 57 dB reduction in back lobe spillover due to serrations break phase cohesion.

Figure 6E:
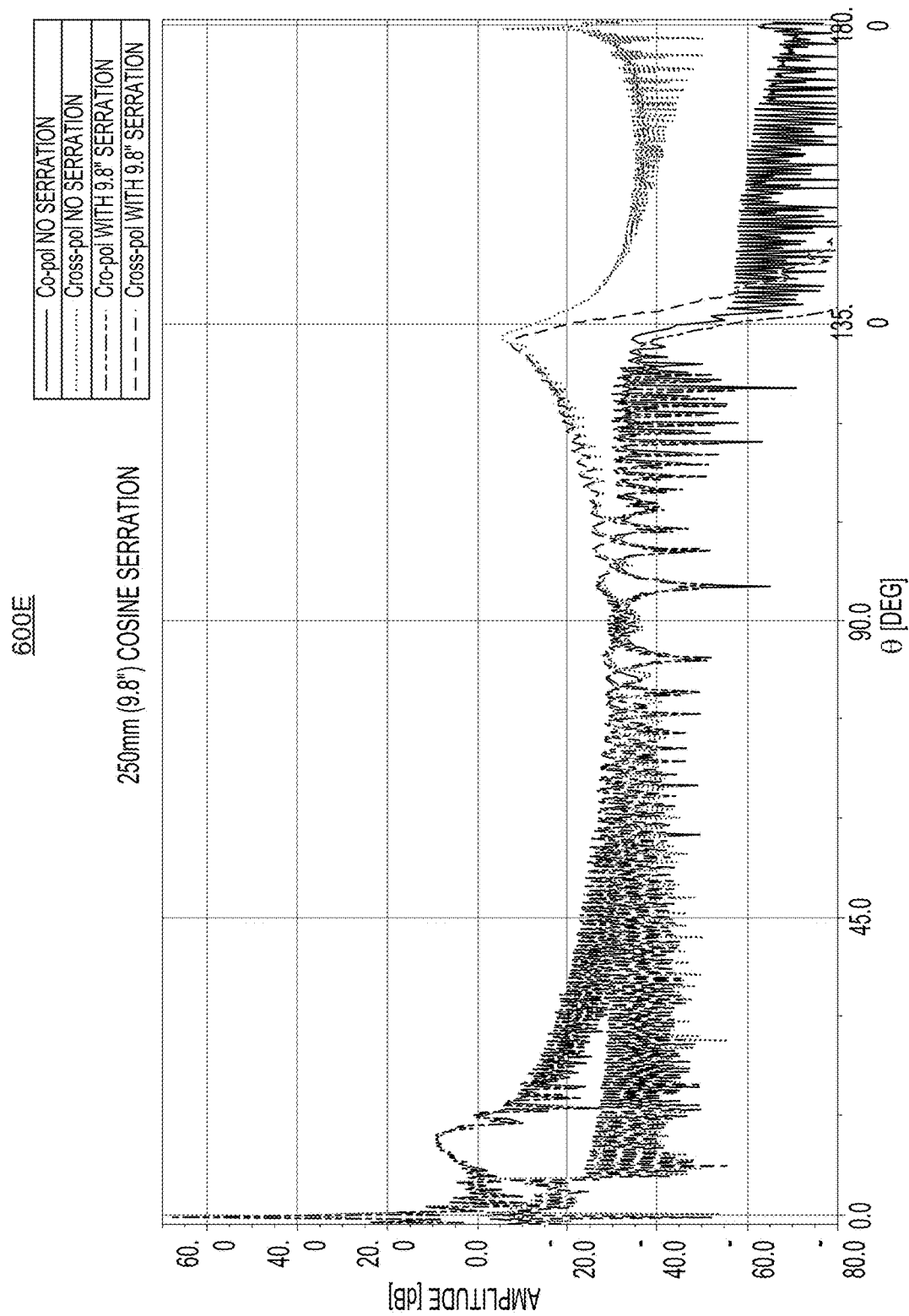

FIG. 6E illustrates a graph 600E of a 25-cm (9.8 inches) curved edge serration for reducing reflector antenna spillover lobes and back lobes in earth-station antennas, according to an example. As shown in graph 600E, this particular configuration may yield a 2.7 dB reduction in side lobe spillover, mainly due to the larger effective reflector diameter, and a 65 dB reduction in back lobe spillover due to serrations break phase cohesion.

Figure 6F:
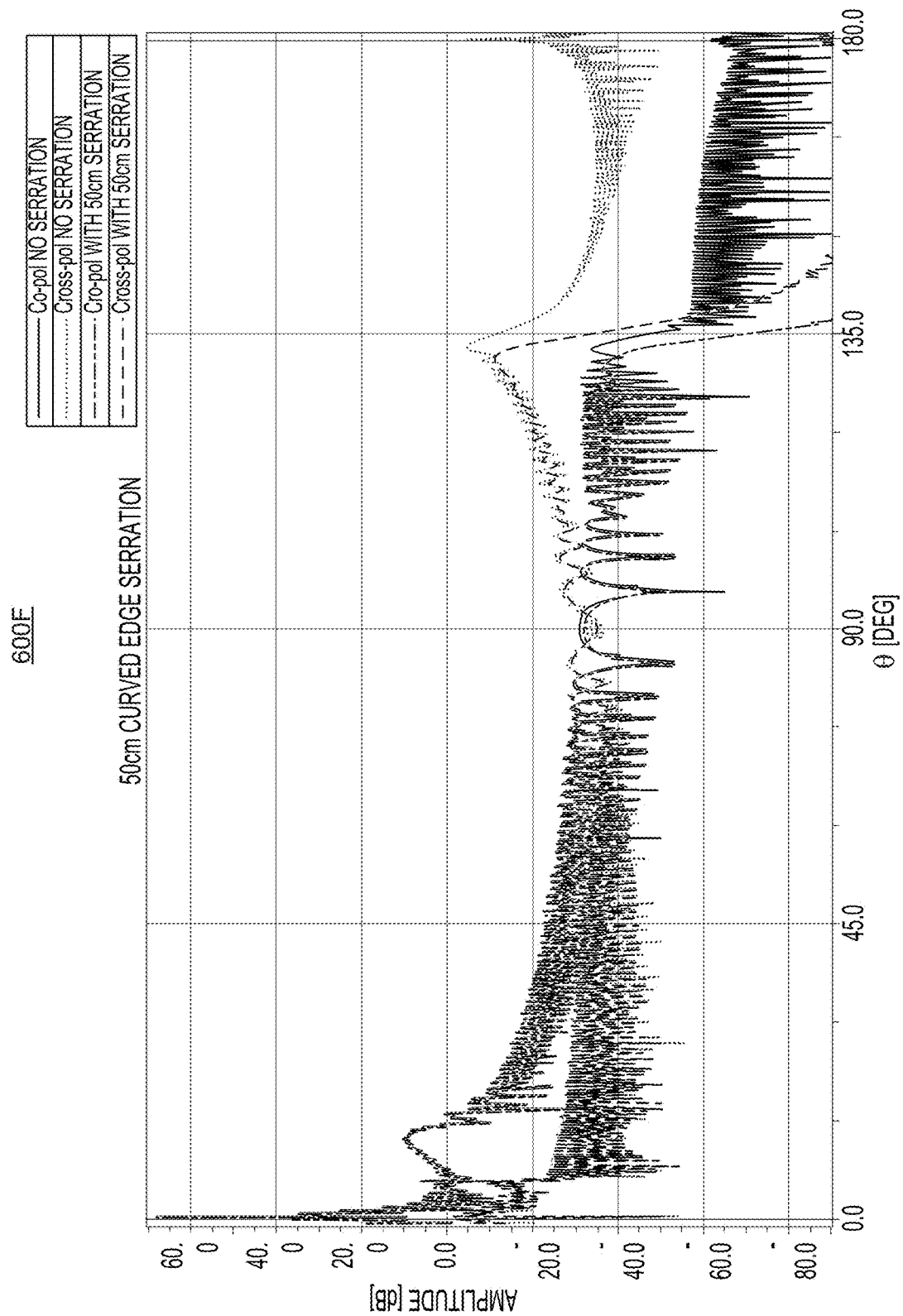

FIG. 6F illustrates a graph 600F of a 50-cm (19.7 inches) curved edge serration for reducing reflector antenna spillover lobes and back lobes in earth-station antennas, according to an example. As shown in graph 600F, this particular configuration may yield a 5.5 dB reduction in side lobe spillover, mainly due to the larger effective reflector diameter, and a 77 dB reduction in back lobe spillover due to serrations break phase cohesion.

Figure 6G:
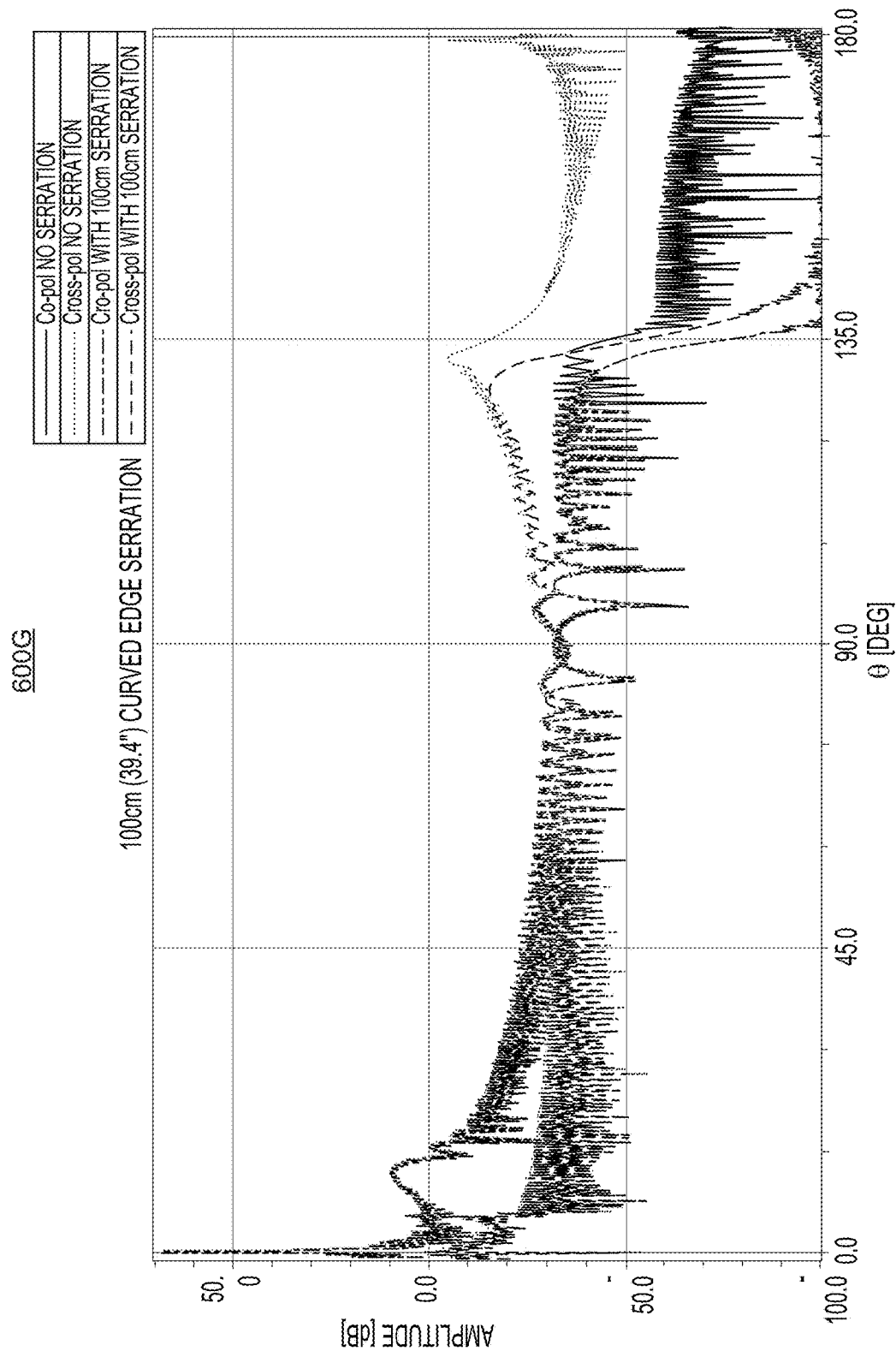

FIG. 6G illustrates a graph 600G of a 100-cm (39.4 inches) curved edge serration for reducing reflector antenna spillover lobes and back lobes in earth-station antennas, according to an example. As shown in graph 600G, this particular configuration may yield a 9.8 dB reduction in side lobe spillover, mainly due to the larger effective reflector diameter, and an 83 dB reduction in back lobe spillover due to serrations break phase cohesion.

The edge serrations may provide additional area for shielding or cancellation of unwanted radiation or antenna spillover. It should be appreciated that simulation using curved serrations, when compared to straight serrations of the same size and dimension, had lesser side lobe reduction but more back lobe reduction. It should be appreciated that any number of sizes, shapes, and/or dimensions may also be provided beyond what has been shown or described depending on each antenna location, geography, configuration, desired result, and/or compliance to specific laws or regulations.

Figure 7:
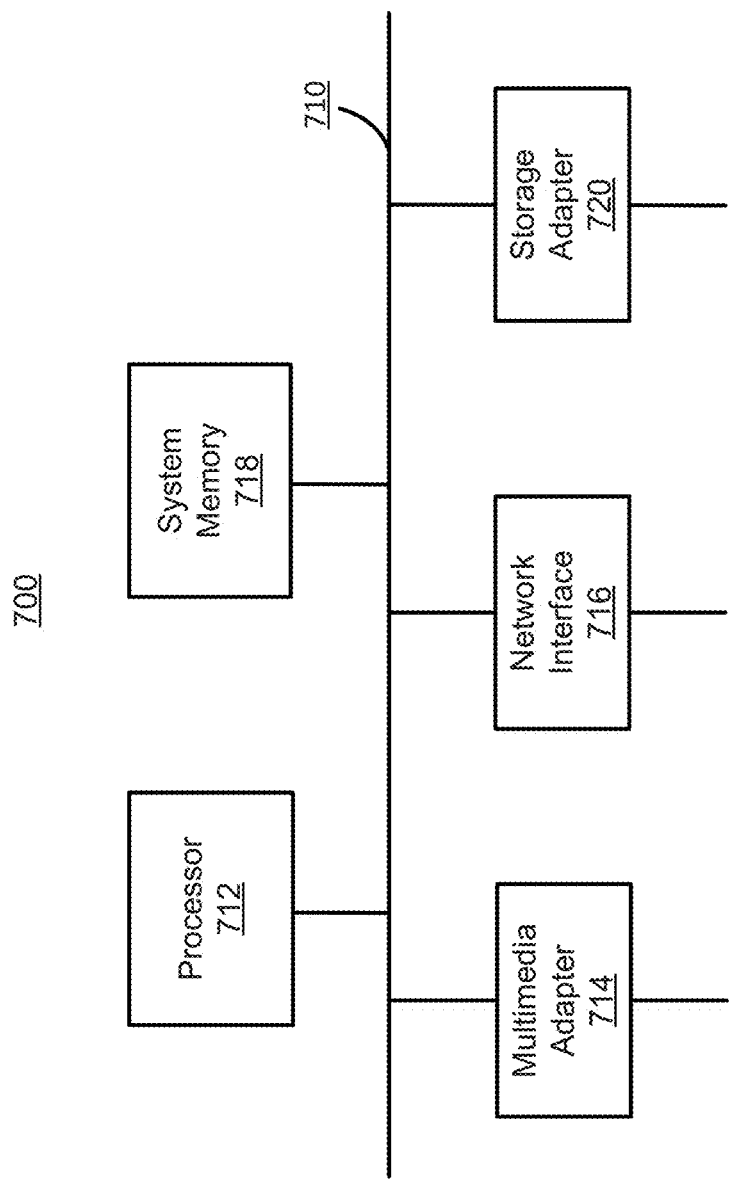
FIG. 7 illustrates a block diagram of a computer system for reducing reflector antenna spillover lobes and back lobes in earth-station antennas, according to an example.

FIG. 7 illustrates a block diagram of a computer system for reducing reflector antenna spillover lobes and back lobes in earth-station antennas, according to an example. The computer system 700 may be part of or any one of the terminals 110, the gateway 130, the network data center 140, the network management system (NMS) 150, the business system 160, as shown in system 100 and/or 200 to perform the functions and features described herein. The computer system 700 may include, among other things, an interconnect 710, a processor 712, a multimedia adapter 714, a network interface 716, a system memory 718, and a storage adapter 720.

The interconnect 710 may interconnect various subsystems, elements, and/or components of the computer system 700. As shown, the interconnect 710 may be an abstraction that may represent any one or more separate physical buses, point-to-point connections, or both, connected by appropriate bridges, adapters, or controllers. In some examples, the interconnect 710 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 710 may allow data communication between the processor 712 and system memory 718, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 712 may be the central processing unit (CPU) of the computing device and may control overall operation of the computing device. In some examples, the processor 712 may accomplish this by executing software or firmware stored in system memory 718 or other data via the storage adapter 720. The processor 712 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 714 may connect to various multimedia elements or peripherals. These may include a devices associated with visual (e.g., video card or display), audio (e.g., sound card or speakers), and/or various input/output interfaces (e.g., mouse, keyboard, touchscreen).

The network interface 716 may provide the computing device with an ability to communicate with a variety of remove devices over a network (e.g., private network 170 or public network 180 of FIG. 1) and may include, for example, an Ethernet adapter, a Fibre Channel adapter, and/or other wired- or wireless-enabled adapter. The network interface 716 may provide a direct or indirect connection from one network element to another, and facilitate communication and between various network elements.

The storage adapter 720 may connect to a standard computer-readable medium for storage and/or retrieval of information, such as a fixed disk drive (internal or external).

Many other devices, components, elements, or subsystems (not shown) may be connected in a similar manner to the interconnect 710 or via a network (e.g., private network 170 or public network 180 of FIG. 1). Conversely, all of the devices shown in FIG. 7 need not be present to practice the present disclosure. The devices and subsystems can be interconnected in different ways from that shown in FIG. 7. Code or computer-readable instructions to implement the dynamic approaches for payment gateway selection and payment transaction processing of the present disclosure may be stored in computer-readable storage media such as one or more of system memory 718 or other storage. Code or computer-readable instructions to implement the dynamic approaches for payment gateway selection and payment transaction processing of the present disclosure may also be received via one or more interfaces and stored in memory. The operating system provided on computer system 700 may be MS-DOS®, MS-WINDOWS®, OS/2®, OS X®, IOS®, ANDROID®, UNIX®, Linux®, or another operating system.

Figure 8:
FIG. 8 illustrates a flowchart of a method for reducing reflector antenna spillover lobes and back lobes in earth-station antennas of a satellite communication system.

FIG. 8 illustrates a flowchart of a method for reducing reflector antenna spillover lobes and back lobes in earth-station antennas of a satellite communication system. The method 800 is provided by way of example, as there may be a variety of ways to carry out the method described herein. Although the method 800 is primarily described as being performed by system 100 as shown in FIG. 1 or the antennas of FIGS. 4A-6G, the method 800 may be executed or otherwise performed by other systems, or a combination of systems. Each block shown in FIG. 8 may further represent one or more processes, methods, or subroutines, and one or more of the blocks may include machine-readable instructions stored on a non-transitory computer-readable medium and executed by a processor or other type of processing circuit to perform one or more operations described herein At 810, an antenna terminal for a satellite communication system may be provided. In some examples, the antenna terminal may include a sub-reflector and a main reflector, as described herein.

At 820, the main reflector may be provided with at least one of an antenna extension, a shroud, or a serrated edge. In some examples, the sub-reflector and the main reflector of the antenna terminal may be provided and configured to reduce antenna spillover in accordance with antenna performance and interference restrictions.

As described herein, the antenna extension may include a full rim antenna extension or a partial antenna extension to increase surface area of the main reflector and minimize stray or undesirable radiation spillover. In some examples, the full rim antenna extension may provide a 1-meter rim around the main reflector. In some examples, the partial rim antenna extension may include at least two 1×3 meter extensions at two predetermined locations around the main reflector to minimize the "rabbit ears," described above.

It should be appreciated that the shroud may also be a full shroud or a partial shroud to increase surface area of the main reflector and minimize stray or undesirable radiation spillover. In some examples, the full shroud may be a 1.5-meter shroud around the main reflector. In some examples, the partial shroud may include at least two 1.5×2 meter partial shrouds at two predetermined locations around the main reflector.

As described herein, the main reflector may also be provided with edge serration. In some examples, the serrated edge of the main reflector may have a size comprising at least one of 25 cm, 50 cm, or 100 cm. In some examples, the serrated edge may have a straight edge serration profile or a curved edge serration profile. As described above, the sizes, shapes, dimensions, and profiles are provided as examples, and the benefits and advantages are described above.

As mentioned above, what is shown and described with respect to the systems and methods above are illustrative. While examples described herein are directed to configurations as shown, it should be appreciated that any of the components described or mentioned herein may be altered, changed, replaced, or modified, in size, shape, and numbers, or material, depending on application or use case, and adjusted for monitoring system health and/or detecting faults.

It should be appreciated that the systems and methods described herein may facilitate more reliable use of terminals to reduce or minimize antenna spillover or unwanted radiation. It should also be appreciated that the systems and methods, as described herein, may also include or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the satellite communications system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to satellite communication systems, including high throughput satellite (HTS) systems, it should be appreciated that the systems and methods described herein may also be used in other various systems and other implementations. For example, these may include other various telecommunication test and measurement systems. In fact, there may be numerous applications in cable or optical communication networks, not to mention fiber-optic or sensor systems that could employ the systems and methods as well.

It should be appreciated that the systems and methods described herein may also be used to help provide, directly or indirectly, measurements for distance, angle, rotation, speed, position, wavelength, transmissivity, and/or other related tests and measurements.

By providing full or partial antenna extensions, shrouds, or serration configurations to existing antenna reflectors, the system and methods described herein may efficiently provide a cost-effective approach so solve problems associated with unwanted radiation or antenna spillover may be readily integrated into various and existing network equipment. The systems and methods described herein may further allow current systems to comply with developing and updated regulatory requirements that restrict or limit antenna interference, especially with regard to interference in spectrums that overlap with cellular communications systems, such as 5G or other similar cellular services. For example, the systems and methods described herein may be used by terminal antennas and gateway antennas that operate in the frequency bands covered by the FCC 25-136, namely 24.75-25.25 GHz, 27.5-23.35 GHz, 37.5-40 GHz, 47.2-48.2, GHz and 50.4-51.4 GHz.

The examples described herein also provide mechanical simplicity and adaptability to small or large satellite communication systems. Ultimately, the systems and methods described herein may increase efficiency, reduce cost, maximize existing equipment, minimize adverse effects of traditional systems, and reduce interference or antenna spillover as required by regulatory and governing bodies, such as the FCC.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. An apparatus, comprising:
an antenna terminal for a satellite communication system, the antenna terminal comprising:
a sub-reflector; and
a main reflector, the main reflector comprising an antenna extension and a serrated edge, the antenna extension being configured to reduce antenna spillover, wherein the serrated edge includes an edge defining tips of serration and foot of serration, and wherein the serrated edge has a profile comprising a straight edge serration;
wherein the sub-reflector and the main reflector of the antenna terminal are configured to reduce antenna spillover in accordance with antenna performance and interference restrictions; wherein the antenna extension comprises one of a full rim antenna extension and a partial rim antenna extension, wherein the full rim antenna extension provides an 'n'-meter rim around the main reflector, and the full rim antenna extension is configured to reduce antenna back-lobes by 14.6 dB, and the partial rim antenna extension comprises at least two x*y meter extensions at a plurality of predetermined locations around the main reflector, wherein the partial rim antenna extension is configured to reduce the antenna back-lobes by 29.6 dB, wherein the antenna terminal operates in a frequency range between 24.75-25.25 GHZ, 27.5-28.35 GHZ, 37.5-40 GHZ, 47.2-48.2, GHz and 50.4-51.4 GHz.

2. The apparatus of claim 1, wherein the serrated edge of the main reflector has a size comprising at least one of 25 cm, 50 cm, or 100 cm.

3. A method, comprising:
providing an antenna terminal for a satellite communication system with a sub-reflector and a main reflector; and
providing the main reflector with an antenna extension for reducing antenna spillover and a serrated edge, wherein the serrated edge includes an edge defining tips of serration and foot of serration, wherein the serrated edge has a profile comprising a straight edge serration;
wherein the sub-reflector and the main reflector of the antenna terminal are configured to reduce the antenna spillover in accordance with antenna performance and interference restrictions;
wherein the antenna extension comprises one of a full rim antenna extension for reducing antenna back-lobes by 14.6 dB and a partial rim antenna extension for reducing the antenna back-lobes by 29.6 dB, and wherein the full rim antenna extension provides an 'n'-meter rim around the main reflector, and the partial rim antenna extension comprises at least two x*y meter extensions at a plurality of predetermined locations around the main reflector, wherein the antenna terminal operates in a frequency range between 24.75-25.25 GHZ, 27.5-28.35 GHZ, 37.5-40 GHZ, 47.2-48.2, GHz and 50.4-51.4 GHz.

4. The method of claim 3, wherein the serrated edge of the main reflector has a size comprising at least one of 25 cm, 50 cm, or 100 cm.

5. A non-transitory computer-readable storage medium having an executable stored thereon, which when executed instructs a processor to perform the following:
providing an antenna terminal for a satellite communication system with a sub-reflector and a main reflector; and
providing the main reflector with an antenna extension for reducing antenna spillover and a serrated edge, wherein the serrated edge includes an edge defining tips of serration and foot of serration, wherein the serrated edge has a profile comprising a straight edge serration;
wherein the sub-reflector and the main reflector of the antenna terminal are configured to reduce the antenna spillover in accordance with antenna performance and interference restrictions; and
wherein the antenna extension comprises one of a full rim antenna extension for reducing antenna back-lobes by 14.6 dB and a partial rim antenna extension for reducing the antenna back-lobes by 29.6 dB, the full rim antenna extension provides an 'n'-meter rim around the main reflector and the partial rim antenna extension comprises at least two x*y meter extensions at a plurality of predetermined locations around the main reflector, wherein the antenna terminal operates in a frequency range between 24.75-25.25 GHz, 27.5-28.35 GHZ, 37.5-40 GHz, 47.2-48.2, GHz and 50.4-51.4 GHz.

6. The non-transitory computer-readable storage medium of claim 5, wherein the serrated edge has a size of 25 cm, 50 cm, or 100 cm.

7. The apparatus of claim 1, wherein the main reflector comprises a shroud and wherein the shroud comprises one of a full shroud and a partial shroud.

8. The apparatus of claim 7, wherein the full shroud provides a n-meter shroud around the main reflector and wherein the partial shroud comprises at least two x*y meter partial shrouds at a plurality of predetermined locations around the main reflector.

9. The method of claim 3, wherein the main reflector comprises a shroud and wherein the shroud comprises one of a full shroud and a partial shroud.

10. The method of claim 9, wherein the full shroud provides a n-meter shroud around the main reflector and wherein the partial shroud comprises at least two x*y meter partial shrouds at a plurality of predetermined locations around the main reflector.

11. The non-transitory computer-readable storage medium of claim 5, wherein the main reflector comprises a shroud and wherein the shroud comprises one of a full shroud and a partial shroud.

12. The non-transitory computer-readable storage medium of claim 11, wherein the full shroud provides a 'n'-meter shroud around the main reflector and wherein the partial shroud comprises at least two x*y meter partial shrouds at a plurality of predetermined locations around the main reflector.

* * * * *